United States Patent [19]
Yamamoto

[11] Patent Number: 5,802,179
[45] Date of Patent: Sep. 1, 1998

[54] INFORMATION PROCESSOR HAVING TWO-DIMENSIONAL BAR CODE PROCESSING FUNCTION

[75] Inventor: Kenji Yamamoto, Nara, Japan

[73] Assignee: Sharp Kabushiki Kaisha, Osaka, Japan

[21] Appl. No.: 620,173

[22] Filed: Mar. 22, 1996

[30] Foreign Application Priority Data

May 18, 1995 [JP] Japan ................. 7-120166

[51] Int. Cl.$^6$ ................................. G10L 3/00
[52] U.S. Cl. ............... 380/51; 704/270; 704/276; 704/278
[58] Field of Search ................. 395/2.44, 2.79, 395/2.84–2.86

[56] References Cited

U.S. PATENT DOCUMENTS

| | | | |
|---|---|---|---|
| 4,764,965 | 8/1988 | Yoshimura et al. | 704/278 |
| 4,897,880 | 1/1990 | Wilber et al. | 382/177 |
| 4,975,957 | 12/1990 | Ichikawa et al. | 704/220 |
| 5,022,081 | 6/1991 | Hirose et al. | 704/235 |
| 5,111,409 | 5/1992 | Gasper et al. | 345/302 |
| 5,177,800 | 1/1993 | Coats | 381/51 |
| 5,359,698 | 10/1994 | Goldberg et al. | 395/2.1 |
| 5,420,924 | 5/1995 | Berson et al. | 380/23 |
| 5,428,210 | 6/1995 | Nair et al. | 235/375 |
| 5,483,052 | 1/1996 | Smith III et al. | 235/472 |
| 5,513,264 | 4/1996 | Wang et al. | 380/51 |
| 5,602,377 | 2/1997 | Beller et al. | 235/462 |

FOREIGN PATENT DOCUMENTS

| | | |
|---|---|---|
| 3-11482 | 1/1991 | Japan . |
| 5-12288 | 1/1993 | Japan . |

*Primary Examiner*—David R. Hudspeth
*Assistant Examiner*—Michael N. Opsasnick
*Attorney, Agent, or Firm*—Nixon & Vanderhye P.C.

[57] ABSTRACT

An information processor capable of scanning and printing two-dimensional bar codes representing sounds and moving images. The processor prints text and graphics, the two-dimensional bar codes, and relational information that correlates the bar codes of sounds and moving images to the associated text and graphics printed by the processor. In addition, the processor (or another processor) scans the printed information, bar codes and relational information. Having scanned the printed information, the processor displays the printed text and graphics in a manner that allows a person viewing the display to mark the displayed text and graphics, and hear the bar-coded sounds and images associated with the marked text and graphics.

10 Claims, 19 Drawing Sheets

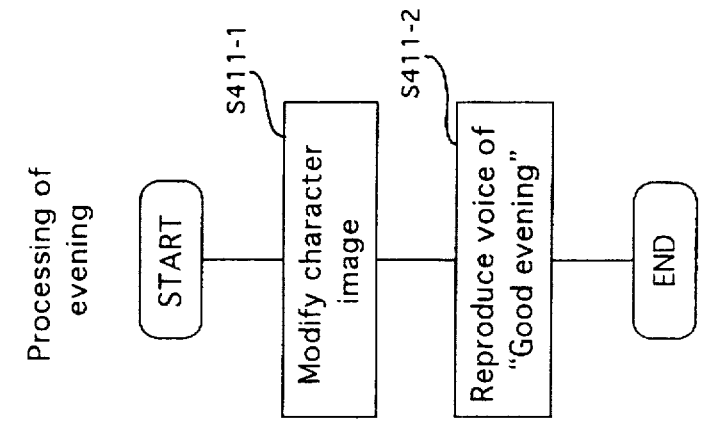
FIG. 12 C Processing of evening
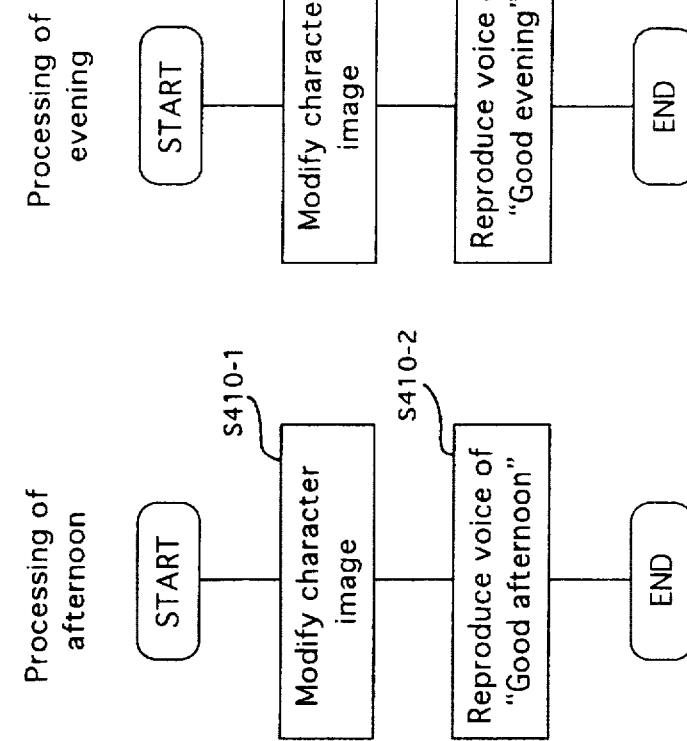
FIG. 12 B Processing of afternoon
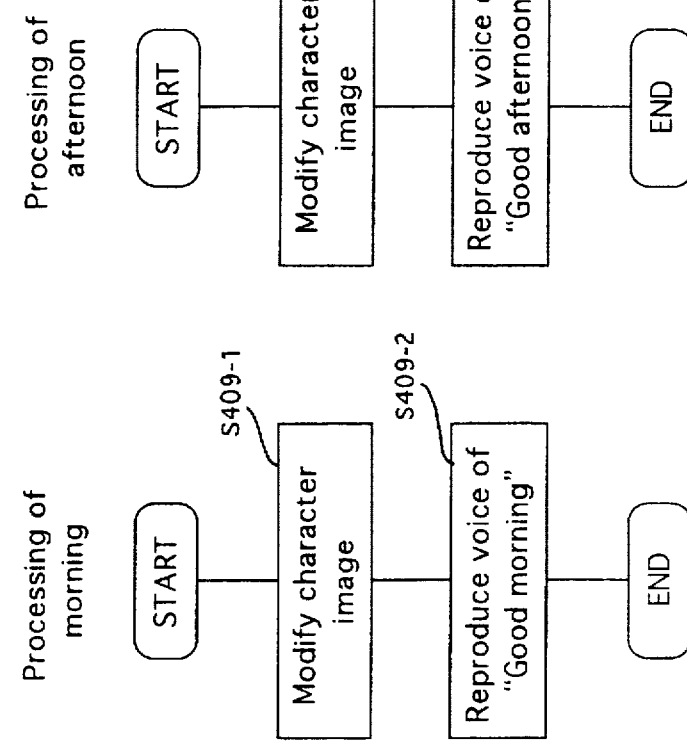
FIG. 12 A Processing of morning

FIG. 13

| No. | Attribute | Comment | coordinates/size | Reproduce |
|---|---|---|---|---|
| 1 | Image | Picture of lion | (o o ȯ o o) | ☐ |
| 2 | Voice | Roar of lion | (o o o .o o o / o o o o o) | ☐ |
|   |   |   |   | ☐ |
|   |   |   |   | ☐ |
|   |   |   |   | ☐ |

Register
Print
Delete
Add

Finish

Related range image

Lion

INFORMATION PROCESSOR HAVING TWO-DIMENSIONAL BAR CODE PROCESSING FUNCTION

BACKGROUND OF THE INVENTION

1. Field of the Invention

The present invention relates to an information processor having two-dimensional bar code processing function, and more particularly to an information processor having two-dimensional bar code processing function which has conventionally been utilized for a word processor, a personal computer, a communication terminal, a POS terminal, a cash register and the like, wherein visual information comprised of document information, image information and graphic information, and sound information converted to two-dimensional bar code are related to each other according to the relational information, printed together on a print sheet, and combined based on the relational information printed on the print sheet so that information transmission is performed.

2. Description of the Related Art

Conventionally, the visual information such as document information, image information or the like has been often exchanged and transmitted by means of a print sheet or a floppy disk. According to an information processor such as a word processor, a personal computer or the like, generally, the visual information is printed on the print sheet, recorded on the floppy disk, transmitted by means of a facsimile, a telephone line or the like, or copied from the print sheet and the floppy disk.

Furthermore, OCR technology for optically reading the document information inputted to the print sheet by handwriting and converting the same to character font (type) has been developed and widely used for electronic translation, information exchange and transmission. There are many problems such as the character recognition ratio and the like. These problems are greatly reduced by conversion into coded information such as a bar code. The bar code is formed by one-dimensional arrangement of numerical data and can easily be recognized by machines. For this reason, the bar code is currently utilized in every field.

As a typical example of the bar code, Japanese Laid-Open Patent No. Hei 5(1993)-12288 has proposed an information processor.

According to the information processor described in Japanese Laid-Open Patent No. Hei 5(1993)-12288, document information is converted into coding information such as JIS code or the like, and bar code is created and printed on a recording sheet. If necessary, the recording sheet is read and inversely converted to restore to the document information. The document information thus obtained can be utilized. Also in the case where the recording sheet is copied or transmitted by a facsimile, the coding information is seldom degraded and information absence and errors are not caused often.

However, since the information volume of the one-dimensional bar code which can be recorded on the print sheet or the like is small, the application is restricted. For example, the one-dimensional bar code is not suitable for coding sound information.

Accordingly, a print sheet on which information is expressed in two-dimensional bar code (mesh pattern) has recently been contemplated in place of the one-dimensional bar code.

The two-dimensional bar code represents binary digital data bits. For example, a print color "white" is represented by "0" and a print color "black" is represented by "1". The small square (mesh) expressed by this method is arranged two-dimensionally, and printed and read so that the digital data which is recorded can be obtained. Consequently, the quantity of information which can be recorded is increased as compared with the one-dimensional bar code according to the prior art. If the sound information is recorded on such a print sheet in two-dimensional bar code having a mesh pattern, the quantity of the sound information which can be recorded is smaller as compared with the case where a magnetic tape is used. However, the sound information can be exchanged and transmitted by a facsimile and distribution costs can be reduced. In addition, since the sound information cannot be decoded visually, secrecy can be observed.

In general, a record medium such as a magnetic tape or a CD has been used for the sound information. In place of such a record medium, a print sheet on which the sound information is recorded in two-dimensional bar code having a mesh pattern has been contemplated (see Japanese Laid-Open Patent No. Hei 3(1991)-11482).

Japanese Laid-Open Patent No. Hei 3(1991)-11482 has disclosed a voice recording method and device and a voice reproducing method and device in which a voice is digitized to generate digital data, and the generated digital data is converted to an image having a mesh pattern and printed on a print medium, and the print medium on which the mesh pattern image having voice information is printed is read by an image reader, digitized and analog-converted so that the voice is reproduced.

According to Japanese Laid-Open Patent No. Hei 3(1991)-11482, however, a paper is substituted for a magnetic tape as a record medium for sound information so that the characteristics of the paper as the record medium can be utilized only for recording and reproduction. For example, the sound information is printed on the print sheet in two-dimensional bar code individually but is not related to other information. For this reason, the range of utilization of the sound information which is expressed in two-dimensional bar code is restricted.

SUMMARY OF THE INVENTION

In consideration of the above circumstances, it is an object of the present invention to provide an information processor having two-dimensional bar code processing function in which the standard sound information and incidental sound information related to visual information can be converted to two-dimensional bar code, the two-dimensional bar code obtained by conversion can be printed on a print sheet, and the standard sound information and incidental sound information printed on the print sheet can be reproduced in pairs.

The present invention provides an information processor having two-dimensional bar code processing function, which includes a function of printing visual information, sound information and relational information relating the visual information to the sound information on a print sheet, the visual information being comprised of document information, image information and graphic information, and a function of reproducing the sound information based on the relational information printed on the print sheet, comprising a visual information input portion for inputting the visual information, a sound information input portion for inputting the sound information, a relational information input portion for inputting the relational information comprised of the standard identification code which is indicative of standard sound information related to the predetermined range of the visual information, and the incidental identification code which is indicative of incidental sound information to the standard sound information, a converting portion for converting the input sound information and relational information into two-dimensional bar code information according to the predetermined procedure for conversion, a printing portion for printing the visual information and the two-dimensional bar code information obtained by conversion on the print sheet, a reading portion for reading the visual information and the two-dimensional bar code information which are printed on the print sheet, a display portion for selectively displaying the read visual information on a screen, a designating portion for partially designating the predetermined range of the visual information which are displayed on the screen, a restoring portion for restoring the two-dimensional bar code information to the sound information related to the designated visual information and the relational information according to the predetermined procedure for restoration, and a reproducing portion for identifying the standard sound information and the incidental sound information based on each identification code of the relational information, and for reproducing the standard sound information and the incidental sound information according to the predetermined procedure for reproduction.

It is another object of the present invention to provide an information processor having two-dimensional bar code processing function for synthesizing and reproducing the standard sound information and incidental sound information related to the visual information at an arbitrary timing.

It is yet another object of the present invention to provide an information processor having two-dimensional bar code processing function in which the visual information as well as the sound information can be converted into two-dimensional bar code, and the two-dimensional bar code obtained by conversion can be related to the visual information which is within the predetermined range printed on a print sheet so as to be utilized.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 12A, 12B and 12C are flowcharts showing a subroutine for each processing shown in FIG. 11;

FIG. 13 is a diagram showing an example of the display of a list which manages two-dimensional bar code information;

DESCRIPTION OF THE PREFERRED EMBODIMENTS

Figure 1:
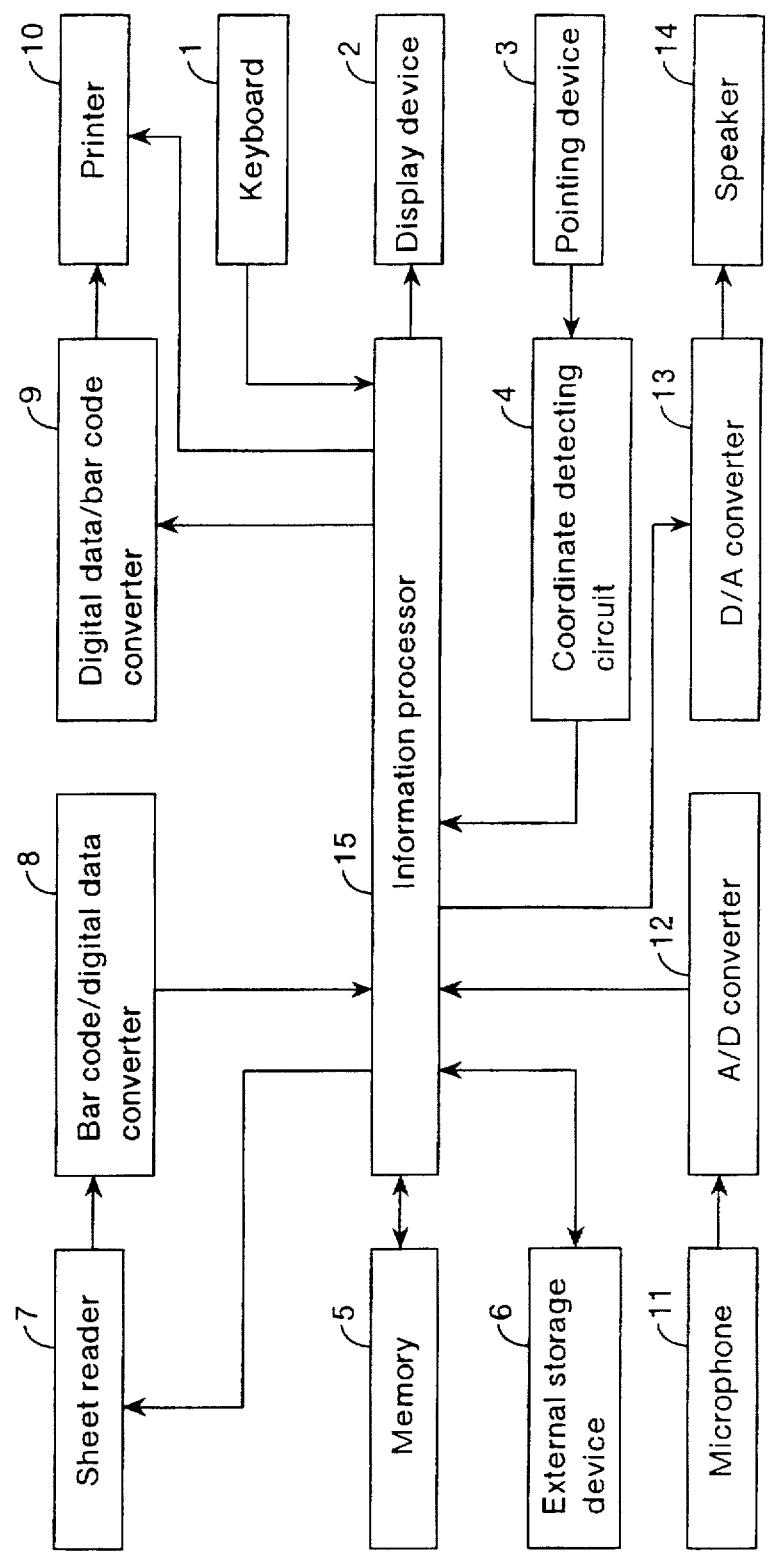
FIG. 1 is a block diagram showing an information processor having two-dimensional bar code processing function according to an embodiment of the present invention.

The present invention provides an information processor having two-dimensional bar code processing function which includes the function of relating visual information comprised of document information, image information and graphic information to sound information according to relational information and printing the same on a print sheet, and the function of reproducing the sound information based on the relational information printed on the print sheet, comprising a visual information input portion for inputting the visual information, a sound information input portion for inputting the sound information, a relational information input portion for inputting the relational information comprised of the standard identification code which is indicative of standard sound information related to the predetermined range of the visual information, and the incidental identification code which is indicative of incidental sound information to the standard sound information, a converting portion for converting the input sound information and relational information to two-dimensional bar code information according to the predetermined procedure for conversion, a printing portion for printing the visual information and the two-dimensional bar code information obtained by conversion on the print sheet, a reading portion for reading the visual information and the two-dimensional bar code information which are printed on the print sheet, a display portion for selectively displaying the read visual information on a screen, a designating portion for partially designating the predetermined range of the visual information which are displayed on the screen, a restoring portion for restoring the two-dimensional bar code information to the sound information related to the designated visual information and the relational information according to the predetermined procedure for restoration, and a reproducing portion for identifying the standard sound information and the incidental sound information based on each identification code of the relational information, and for reproducing the standard sound information and the incidental sound information according to the predetermined procedure for reproduction.

Accordingly, two or more sound information can be related to the visual information within the predetermined range of the print sheet and can be reproduced. For example, the standard sound information and the incidental sound information can automatically be reproduced in pairs.

According to the present invention, the visual information input portion, the relational information input portion, the designating portion, the list information setting portion and the range setting portion are formed by an input device such as a keyboard, a pointing device (a mouse, a pen, etc.) or the like.

The sound information input portion is formed by a microphone.

The converting portion, the restoring portion, the reproducing portion, the sound information synthesizing portion, the list information storage portion, the display control portion and the relational information creating portion are formed by a microcomputer comprised of a CPU, a ROM, a RAM and an I/O port.

In particular, the RAM is used as the sound information synthesizing portion and the list information storage portion, and as means for storing the input visual information and sound information.

The ROM stores various application programs for two-dimensional bar code according to the present invention and programs for functioning as each portion which are executed by the CPU. The converting portion is formed by an A/D converter and a digital data/bar code converter. The restoring portion is formed by a bar code/digital data converter and a D/A converter.

The printing portion is formed by a printer such as a thermal printer or a laser printer. The reading portion is formed by a scanner comprised of a CCD (charge coupled device) or the like, and is used as a device for inputting image information as well as reading the two-dimensional bar code information described on the print sheet.

The display portion is formed by a display device comprised of a LCD (liquid crystal display), a CRT display or the like.

The voice output portion of the reproducing portion is formed by a speaker.

According to the present invention, it is preferred that the information processor having two-dimensional bar code processing function further comprises a sound information synthesizing portion for synthesizing plural sound information based on the relational information.

The relational information includes timing information for causing the sound information synthesizing portion to synthesize plural sound information. Consequently, the plural sound information recorded in two-dimensional bar code can be reproduced at an arbitrary timing. Therefore, the plural sound information can be overlapped and reproduced.

Preferably, the converting portion has the function of converting visual information to two-dimensional bar code information according to the predetermined procedure for conversion, and the restoring portion has the function of restoring the two-dimensional bar code information to the visual information.

According to the above structure, not only the sound information but also the visual information comprised of character information, image information and graphic information are dealt with as the information related to the predetermined range. Consequently, the representation form of a document is expanded so that various using methods can be enhanced.

It is preferred that the relational information includes reproduction condition information indicative of conditions on which the reproducing portion reproduces plural sound information.

According to the above structure, the time conditions are set as reproduction condition information so that different information can automatically be selected and reproduced depending on the reproduction time (for example, the sound information about the greetings of morning, afternoon and evening).

Preferably, the information processor having two-dimensional bar code processing function further comprises a list information setting portion for setting list information indicative of the attribute, coordinates/size and comment of plural two-dimensional bar code information which are related to the visual information, a list information storage portion for storing the set list information, and a display control portion for displaying the list information on the display portion in a multi-window.

According to the above structure, the two-dimensional bar code information described on the print sheet can be listed and the contents thereof can be verified and managed simultaneously. Consequently, the two-dimensional bar code information can be edited more easily.

It is preferred that the relational information includes position information indicative of the predetermined range of visual information and the range of two-dimensional bar code information related to the predetermined range.

Preferably, the information processor having two-dimensional bar code processing function further comprises a modifying portion for modifying the information restored from the two-dimensional bar code information based on the position information of the relational information.

According to the above structure, it is possible to verify whether the contents of the two-dimensional bar code information corresponds to the information which is within the related range or not, and to modify the same.

The present invention will be described in detail with reference to the drawings and should not be construed as being limited by the following embodiments. An information processor having two-dimensional bar code processing function according to the present invention is particularly applied to a word processor, a personal computer, a communication terminal, a POS terminal, a cash register and the like, and can relate sound information converted into two-dimensional bar code and the like to visual information such as document information, image information, graphic information and the like to be recorded on a print sheet, and can record and reproduce them.

FIG. 1 is a block diagram showing an information processor having two-dimensional bar code processing function according to an embodiment of the present invention. In FIG. 1, 1 denotes a keyboard which functions as a visual information input portion, a relational information input portion, a designating portion, a list information setting portion and a range setting portion, 2 denotes a display device such as an LCD (liquid crystal display), a CRT display or the like which functions as a display portion, 3 denotes a pointing device for designating coordinates on a display screen which functions as the designating portion and the range setting portion, 4 denotes a coordinate detecting circuit for detecting positional coordinates designated by the pointing device 3, and 5 denotes a memory formed by a RAM which functions as a visual information storage portion, a two-dimensional bar code information storage portion and a list information storage portion. Various data which are being converted and restored are temporarily stored in work areas of the memory 5. 6 denotes an external storage device such as a floppy disk, a hard disk or the like, and is used as an auxiliary storage device.

7 denotes a sheet reader which is a scanner comprised of a CCD (charge coupled device), and functions as a reading portion for reading the visual information, two-dimensional bar code information and relational information which are printed on the print sheet. In addition, the sheet reader 7 is used as a device for inputting image information as well as reading an information source printed on the print sheet.

8 denotes a bar code/digital data converter for converting the read two-dimensional bar code information to digital data, and functions as a restoring portion. 9 denotes a digital data/bar code converter for converting the digitized sound information to two-dimensional bar code, and functions as a converting portion. 10 denotes a printer such as a thermal printer, a laser printer or the like, and functions as a printing portion.

11 denotes a microphone for fetching sound information and functions as a sound information input portion.

12 denotes an A/D converter for converting the analog signal of the input sound information to a digital signal, and functions as a part of the converting portion.

13 denotes a D/A converter for converting the digitized sound information to an analog signal, and functions as a part of the restoring portion.

14 denotes a speaker for outputting the sound information converted to the analog signal, and functions as a portion for reproducing the sound information.

15 denotes an information processor for controlling all the circuits (each portion), which is formed by a microcomputer comprised of a CPU, a RAM, a ROM and an I/O port. The ROM stores a program for controlling each circuit (each portion), various application programs for two-dimensional bar code according to the present invention, and the like. The information processor 15 functions as the converting portion, the restoring portion, the reproducing portion, the sound information synthesizing portion, the display control portion, the modifying portion, the list information setting portion, the relational information creating portion and the like.

The sheet reader 7 reads the sheet information printed on a print sheet. Then, the bar code/digital data converter 8 extracts two-dimensional bar code information from the read sheet information (sheet image) on the print sheet and converts the same to digital data.

Various data such as the read sheet image, the two-dimensional bar code converted to the digital data and the like are stored in the memory 5. The sheet image and others are expanded into display data and displayed on the screen of the display device 2.

A user designates an arbitrary position of the sheet image displayed on the screen by the cursor operation of the keyboard 1, the pointing device 3 or the like. The coordinate detecting circuit 4 detects the designated position on a sheet. The information processor 15 decides whether the position is within the range to which two-dimensional bar code is related. If any, the related data are reproduced.

The sound information which should be reproduced is outputted to the speaker 14 through the D/A converter 13. The visual information comprised of character information, image information and graphic information which should be restored and reproduced are outputted to the display device 2. If necessary, a voice is fetched by the microphone 11, converted to digital data through the A/D converter 12, and stored in the memory 5. Various data thus converted can be registered in the external storage device 6 and read out as required.

In order to convert the related sound information and the like to two-dimensional bar code information and print the same on the print sheet, the digital data (for example, sound information) converted by the A/D converter 12 is converted to a two-dimensional bar code image through the digital data/bar code converter 9. Other visual information such as document information, image information and the like are directly outputted to the printer 10 and printed on the print sheet.

Figure 2:
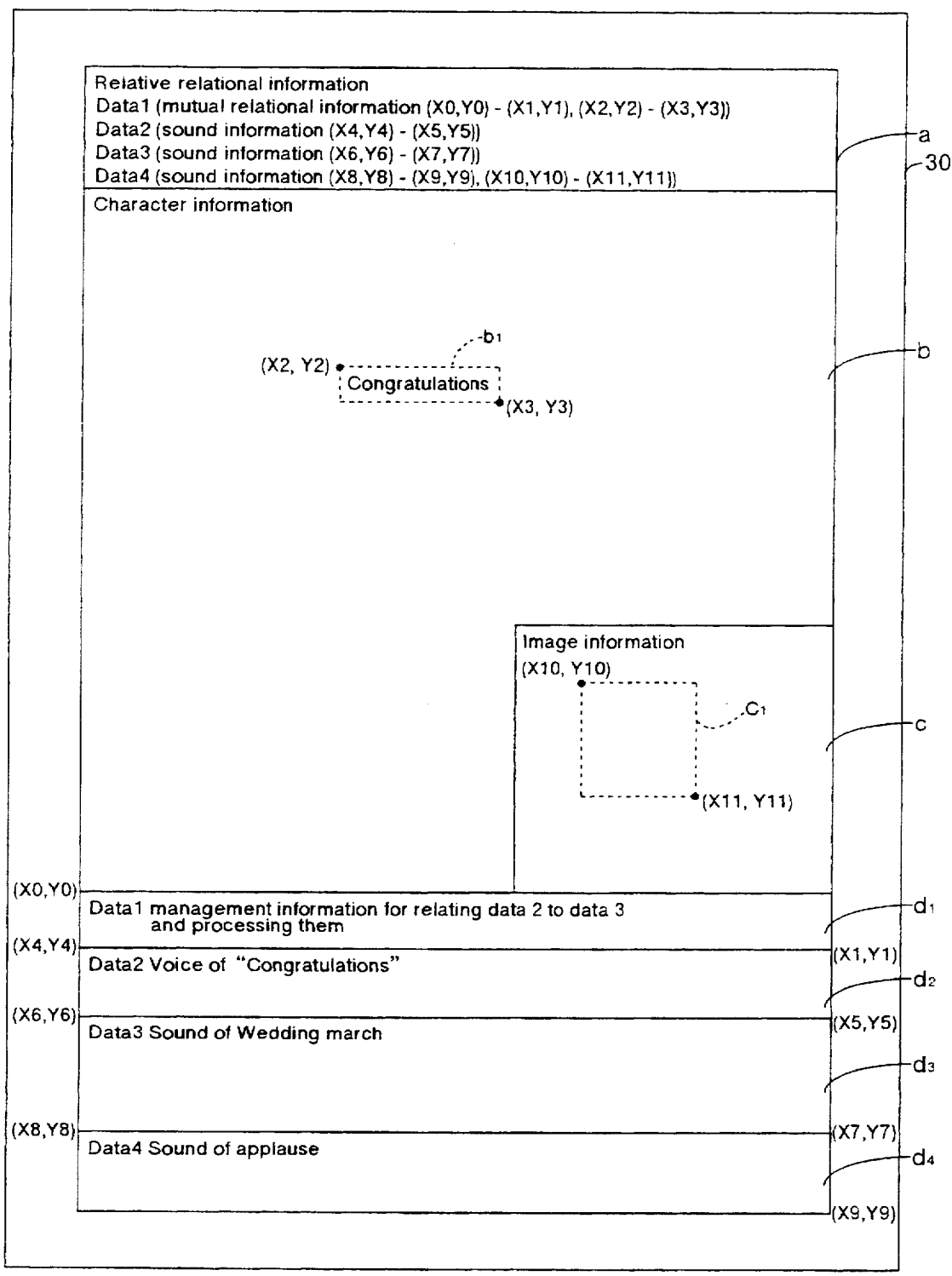
FIG. 2 is a diagram showing a print sheet (1) to which two-dimensional bar code is applied according to the present invention.

FIG. 2 is a diagram showing a print sheet (1) to which two-dimensional bar code is applied according to the present invention. In FIG. 2, 30 denotes a print sheet on which visual information comprised of typed character information and image information, two-dimensional bar code information, and the relational information are printed together.

As will be described below, the relational information which should be printed on the print sheet is divided into relative relational information and mutual relational information. The relative relational information includes position information which indicates the position (coordinates) and area of the two-dimensional bar code information and the visual information related to the two-dimensional bar code information. The mutual relational information includes management information for relating and processing plural two-dimensional bar code information.

Field a describes the relative relational information converted by the two-dimensional bar code information. Field b describes the typed character information. Field c describes the image information. Fields d1 to d4 describe the two-dimensional bar code information. Field d1 describes the mutual relational information. Field d2 describes the standard sound information. Fields d3 and d4 describe the incidental sound information (dependent sound information).

EMBODIMENT 1

In FIG. 2, if another sound information (d3) should be reproduced subsequently to the standard sound information (d2), the identification code of the standard sound information and the number (identification code) of the incidental sound information which should be reproduced successively are added to the beginning of the standard sound information. If the number is recognized, there is the sound information which should be reproduced successively.

Figure 3:
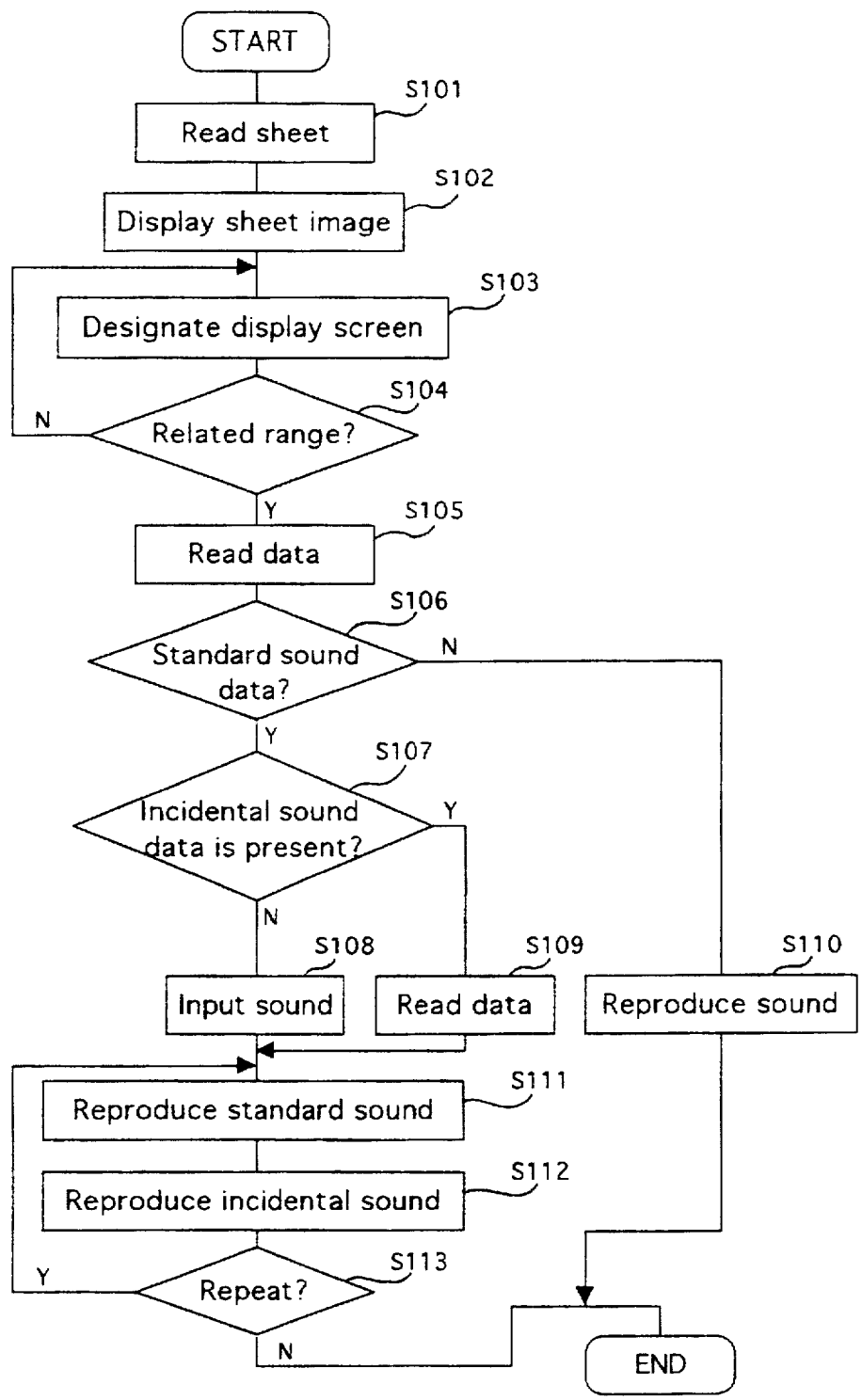
FIG. 3 is a flowchart showing the processing operation according to Embodiment 1 of the present invention.

FIG. 3 is a flowchart showing the processing operation according to Embodiment 1 of the present invention. In FIG. 3, a sheet image (sheet information) printed on a print sheet (see FIG. 2) is read from the sheet reader 7 (Step S101), and the read sheet image is displayed on the display device 2 (Step S102). When first reading the sheet image, the information processor 15 recognizes the position on the print sheet for the two-dimensional bar code information of the required sound information from the relative relational information and the mutual relational information.

The above information is recorded in the memory 5 provided in a body and is managed by the identification code or number. If the memory 5 has enough room, the sound information converted to two-dimensional bar code is stored in the memory 5 provided in the body, and utilized as required.

The arbitrary position of the sheet image displayed on the display device 2 is designated by the cursor operation of the keyboard 1 or pointing device 3 (Step S103). It is decided whether the designated position is within the related range or not (Step S104). If the designated position is not within the related range, the routine returns to the display screen of Step S103 and stands by. If the designated position is within the related range, each data for the related two-dimensional bar code is read (Step S105). It is decided whether the data is the standard sound information (standard voice data) or not (Step S106). The sound information is outputted to the speaker 14 through the D/A converter 13 so as to be reproduced if it is not the standard sound information (Step S110).

It is decided whether two-dimensional bar code information corresponding to the number of incidental sound information (incidental voice data) is present or not (Step S107). If the corresponding number is present, the incidental sound information is read (Step S109). If the incidental sound information is not present, sound information is newly inputted from the microphone 11 and stored as incidental sound information in the memory 5 through the A/D converter 12 (Step S108).

The original standard sound information is reproduced (Step S111). When finishing reproduction, the incidental sound information is reproduced successively (Step S112). The routine returns to the processing for reproducing the original standard sound information and incidental sound information and repeats the same as required (Step S113).

According to Embodiment 1 shown in FIG. 3, two or more sound information can be reproduced continuously. If the first standard sound information is reproduced, the next incidental sound information is retrieved. If the prior sound information is completely reproduced, the next dependent sound information can also be reproduced automatically.

If the next sound information which is specified is not present, a voice is inputted from the microphone 11 and reproduced as the next sound information. Accordingly, the standard sound information and the sound information dependent thereon can be reproduced in pairs.

For example, when hearing two sound information (voice data) in comparison with each other, an operator should designate reproduction of each sound. However, operation can be performed easily by the structure in which the two sound information can be reproduced continuously.

When comparing a voice of a good example with your pronunciation in the conversation practice of foreign languages, it is possible to alternately hear the voice of a good example and your pronunciation easily. Consequently, your pronunciation can be judged objectively so that a linguistic skill can be enhanced.

EMBODIMENT 2

Figure 4:
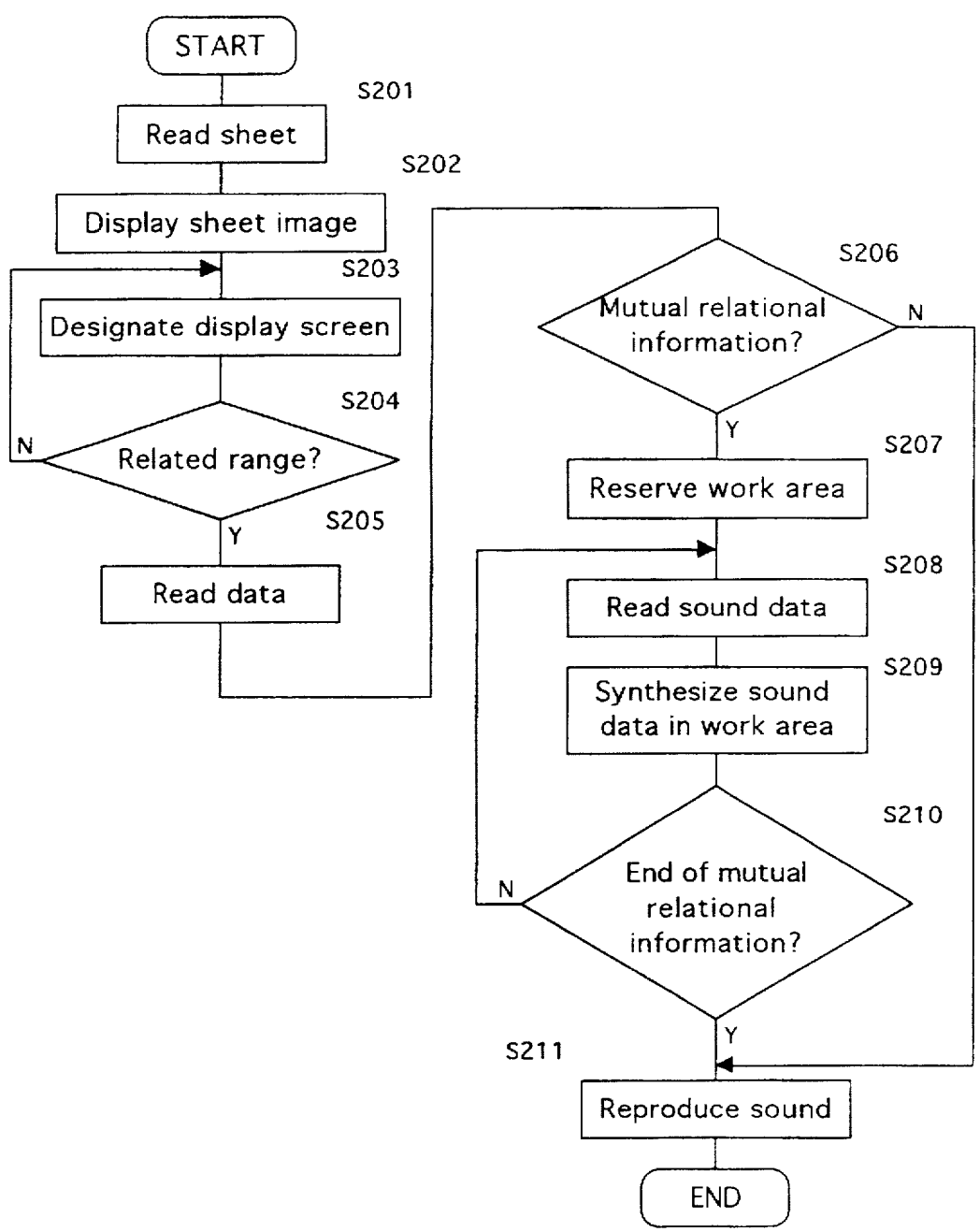
FIG. 4 is a flowchart showing the processing operation according to Embodiment 2 of the present invention.

FIG. 4 is a flowchart showing the processing operation according to Embodiment 2 of the present invention. Embodiment 2 shown in FIG. 4 will be described below with reference to the diagram for explaining the print sheet shown in FIG. 2.

As shown in FIG. 2, the relative relational information expressed in two-dimensional bar code is printed on a portion of the print sheet (1) which is first scanned. The relative relational information includes the identification code, number and attribute of two-dimensional bar code information, and position information indicative of the range on the print sheet to which information is related. Subsequently, visual information such as document information, image information and the like, and two-dimensional bar code information of mutual relational information, sound information and the like are printed as sheet images (sheet information) on the print sheet. Consequently, these information are read by the sheet reader 7 and properly stored in the memory 5 (Step S201). The read sheet image is displayed on the display device 2 (Step S202).

The arbitrary position of the sheet image displayed on the display screen is designated by the pointing device 3 (Step S203). It is decided whether the arbitrary position is within the related range or not (Step S204). If the arbitrary position is within the related range, the related two-dimensional bar code is read (Step S205). It is decided whether the data is the mutual relational information or not (Step S206). If the data is not the mutual relational information, the routine proceeds to the processing for reproducing the sound information (Step S211) so as to output the sound information (voice data) from the speaker 14.

If the data is the mutual relational information, a work area for processing the voice data is reserved (Step S207). The two-dimensional bar code of the voice data is read according to the contents of description of the mutual relational information (Step S208). The voice data are synthesized according to the contents of description of the mutual relational information in the work area of the memory 5 (Step S209).

If the description of the mutual relational information is not ended (Step S210), the routine returns to the processing for reading the voice data. When the voice data are completely synthesized based on the contents of description of the mutual relational information, the synthesized voice data is outputted to the speaker 14 through the D/A converter 13 so that voice data is reproduced (Step S211).

The print sheet (1) shown in FIG. 2 will be described again. For example, character information such as a word of blessing for a friend who will get married is described in Field b on the print sheet. A message related to the sound information, i.e., "Congratulations!" is described within the range b1 "(X2, Y2)–(X3, Y3)".

Two-dimensional bar code information and sound information thereof are printed in Fields a and d1 to d4. The position information of the two-dimensional bar code information (d1, d2, d3, d4), and character information (b1) and image information (c1) related to he two-dimensional bar code information are printed in two-dimensional bar code in Field a.

The two-dimensional bar code of data 1 (d1) is the mutual relational information for relating and processing the two-dimensional bar code of plural sound information. Herein, the two-dimensional bar code of data 2 (d2) and data 3 (d3) which are sound information are related to each other. Timing information is set in such a manner that the sound information expressed in the two-dimensional bar code of the data 3 can be reproduced a little earlier than the sound information expressed in two-dimensional bar code of the data 2.

For example, the mutual relational information for relating the data 2 (d2) to the data 3 (d3) is recorded in a first (d1) two-dimensional bar code information area.

The message of blessing "Congratulations!" is recorded in a voice in a second (d2) two-dimensional bar code information area.

The sound of "Wedding march" is recorded in a third (d3) two-dimensional bar code information area.

The data structure of two-dimensional bar code information will be described below. The data will be given in hexadecimal numbers. Actually, however, the data is expressed in two-dimensional bar code. The numeric values which will be given do not always match the actual data recording method. A mechanism for error detection and the like are also omitted.

Data

Data number: |01 00|

Mutual relational information: |00 00|, (0: Mutual relational information, 1: Voice data)

Data 1: |00 01 00 08 7F 0A FF 08|

The first two-dimensional bar code data (mutual relational information) is printed within the range of (X0=0100, Y0=0800)–(X1=0A7F, Y1=08FF).

Sheet image: |40 06 00 03 38 08 7F 03|

When a cursor is within the range of (X2=0640, Y2=0300)–(X3=0838, Y3=037F) of the sheet image, the first two-dimensional bar code data is read and restored.

Separation code: |FF FF|

Data number: |02 00|

Voice data: |01 00|, (0: Mutual relational information, 1: Voice data)

Data 2: |00 01 00 90 7F 0A FF 0A|

The second two-dimensional bar code data (voice data) is printed within the range of (X4=0100, Y4=0900)–(X5=0A7F, Y5=0AFF).

Separation code: |FF FF| . . . Some relative relational information are arranged.

Two separation codes |FF FF| which are arranged indicate that the relative relational information is ended. Subsequently, the character information, the image information, and the two-dimensional bar code data of the mutual relational information and the sound information are printed.

Data

Data [02 00, 00 00, 00 00 00 00, 03 00, 02 00, 60 F0 FF FF]

[02 00]: The second two-dimensional bar code data (voice data) is selected.

[00 00]: No.0 is set as a standard voice data number which is an identification code of the start of reproduction of the second voice data. (No.0 voice data is virtual working voice data for dealing with plural voice data.)

[00 00 00 00]: An offset value from the identification code of the No.0 voice data which is the standard voice data is 0.

[03 00]: The third two-dimensional bar code data (voice data) is selected.

[02 00]: The second voice data is set to the standard voice data of No.3 voice data.

[60 F0 FF FF]: The reproduction of the voice data is started earlier by 0.5 sec than No.2 voice data. (If a reproduction rate is 8000 data/sec, a hexadecimal number FFFFF060 is a decimal number –4000.)

At a party after a wedding, a friend reads, by means of a sheet reader, a print sheet on which two-dimensional bar code is printed, and designates "Congratulations!" in the words of blessing which are displayed. Consequently, the friend's affectionate voice "Congratulations!" can be heard with "Wedding march" played.

In addition, one of piano sounds is recorded in two-dimensional bar code. The waveform of the sound is modulated, or the amplitude of the sound is increased or decreased to perform processing. If the processed waveforms are synthesized at an arbitrary timing, the music can be played.

In that case, if all voice data are synthesized in the work area of the memory 5 and output to the speaker 14 as shown in the flowchart of FIG. 4, the required capacity of the memory 5 of the information processor is greatly increased.

In consideration of the case where one-second voice data is reproduced every 10 secs 100 times, the one-second voice data is 8K bytes and the size of the mutual relational information is 8 bytes for the description of voice data synthesis, i.e., 1K byte or less for 100 voice data, for example.

These two come to about 9K bytes. Consequently, these voice data can be printed as two-dimensional bar code information on the sheet. However, if the voice waveforms are synthesized without any device, 8×((100−1)×10+1)= 7928K bytes are needed. The information processor which is currently used can keep a memory capacity of a little less than 8M bytes, but is very inefficient.

Accordingly, only the data in the necessary part of each voice data are read and synthesized, and outputted to the speaker 14 little by little, for example, every second to perform data synthesis for the next one second, and then the synthesized data are sequentially outputted. Consequently, about 2 seconds are enough for the CPU of the information processor to handle the memory.

Actually, plural voice waveforms are synthesized and outputted in real time so that very few work areas are required. Since plural voice data can be overlapped at an arbitrary timing, the voice can be reproduced for a very long time as compared with the information volume printed on the sheet.

According to Embodiment 2 shown in FIG. 4, it is possible to add the information which can arrange so that the plural sound information may be overlappingly reproduced at an arbitrary timing. The music can be played depending on a timing at which the voice data is processed and reproduced.

EMBODIMENT 3

Figure 5:
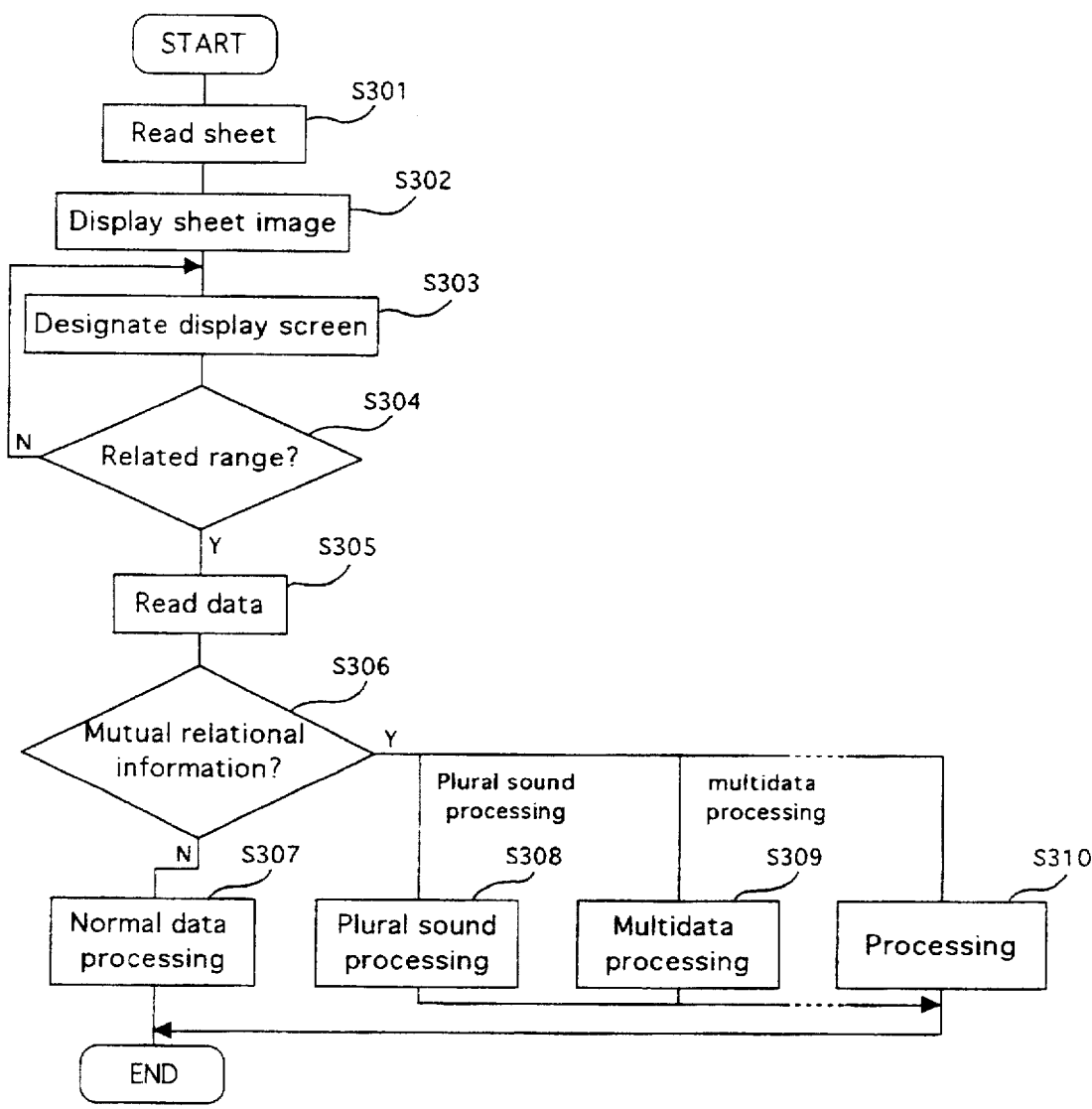
FIG. 5 is a flowchart showing the processing operation according to Embodiment 3 of the present invention.

FIG. 5 is a flowchart showing the processing operation according to Embodiment 3 of the present invention. In FIG. 5, a sheet image on a print sheet is read (Step S301), and the read sheet image is outputted and displayed on the display device (Step S302). The displayed image is designated by the pointing device (Step S303). It is decided whether the designated position is within the related range or not (Step S304).

If the designated position is not within the related range, the routine returns to the display screen designation (Step S303). If the designated position is within the related range, the related data is read (Step S305). It is decided whether the data is the mutual relational information or not (Step S306). If the data is not the mutual relational information, it is merely reproduced (Step S307). If the data is the mutual relational information, its header is verified so that the processing corresponding to the header is executed (Steps S308 to S310).

The processing operation of Steps S301 to S306 is the same as that of Steps S201 to S206 shown in FIG. 4.

Figure 6:
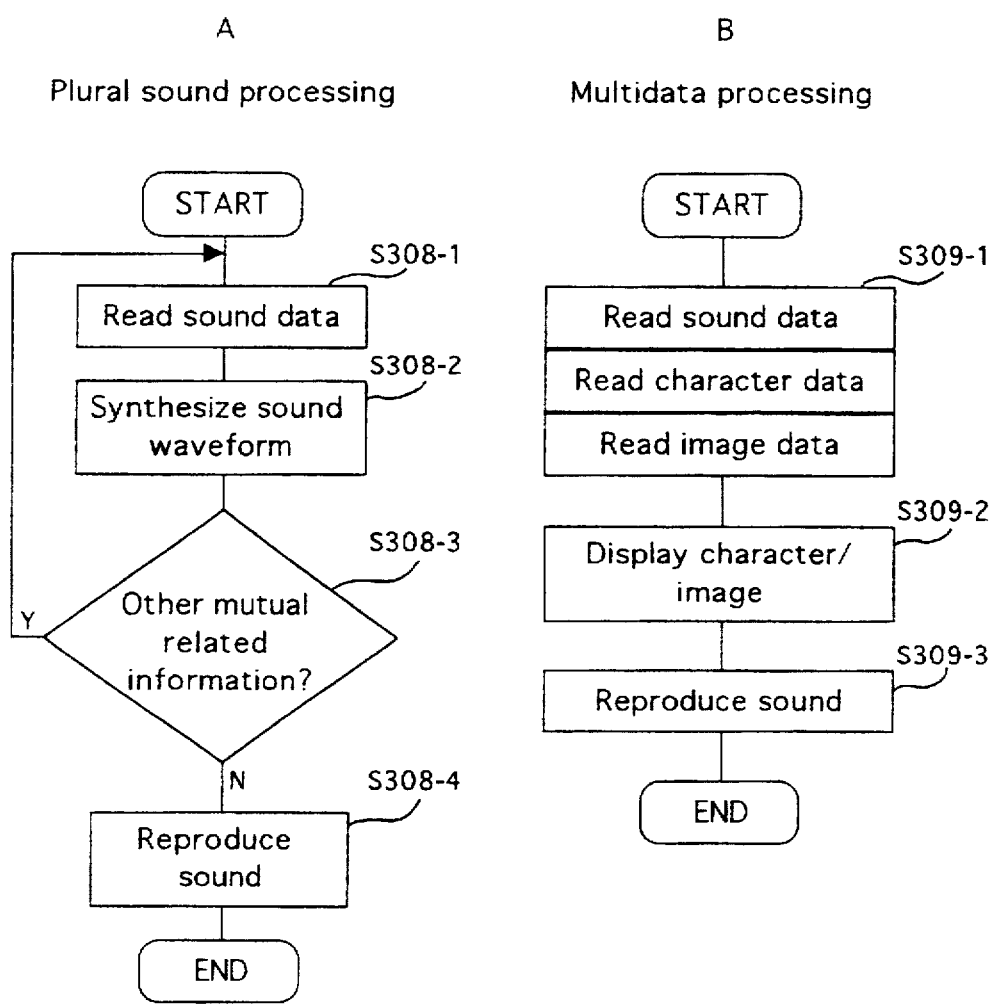
FIGS. 6A and 6B are flowcharts showing a subroutine for each processing shown in FIG. 5.

FIGS. 6A and 6B are flowcharts showing the subroutine for each processing shown in FIG. 5. FIG. 6A shows the subroutine of Step S308 in FIG. 5 (plural voice processing). The processing operation of Steps S308-1 to S308-4 shown in FIG. 6A is the same as that of Steps S208 to S211 shown in FIG. 4. Therefore, the description is omitted.

FIG. 6B shows the subroutine of Step S309 in FIG. 5 (multidata processing). If not only voice data but also character data and image data are related in Step S309, these data are read (Step S309-1), the character data and the image data are outputted to the display device 2 (Step S309-2) and the voice data is reproduced through the speaker 14 (Step S309-3).

The information which indicates the attribute of data converted to the two-dimensional bar code information is added to the relative relational information. The information related to the two-dimensional bar code other than the voice information is added to the mutual relational information which is newly added in Embodiment 2. An example in which information is newly added to the specific example described in Embodiment 2 will be shown below.

Data

Data number: [01 00]

Data attribute: |09 00|, (0: Data, 1: Text, 2: Image, 3: Voice, . . . . 9: Mutual relational information . . . and the like)

Data 1: [00 01 00 08 7F 0A FF 08]

The first two-dimensional bar code data (mutual relational information) is printed within the range of (X0=0100, Y0=0800)–(X1=0A7F, Y1=08FF).

Sheet image: |40 06 00 03 38 08 7F 03]

When a cursor is within the range of (X2=0640, Y2=0300)–(X3=0838, Y3=037F) of the sheet image, the data is reproduced.

Separation code: |FF FF]

Data number: [02 00]

Data attribute: [03 00], (3: Voice)

Data 2: [00 01 00 90 7F 0A FF 0A]

The two-dimensional bar code data (voice data) is printed within the range of (X4=0100, Y4=0900)–(X5=0A7F, Y5=0AFF).

Separation code: [FF FF] . . . Some relative relational information are arranged.

Two separation codes [FF FF] which are arranged indicate that the relative relational information is ended.

Subsequently, the character image, the graphic image and the two-dimensional bar code of the mutual relational information and various information are printed.

Mutual Relational Information

[4D 55 33 49 43 20 20 20]:

Identification code (8 bytes): "MUSIC□□□"

If the above identification code is changed to the identification code for the reproduction related to the data having other attribute such as "MULTI□□□", subsequent data meaning is changed.

[10 00 00 00]: data size (4 bytes)

It is indicated that the data is 16 bytes.

Data: [01 00 00 00 00 00 00 00 02 00 01 00 60 F0 FF FF]

(The same data as in Embodiment 2 is described.)

Figure 8:
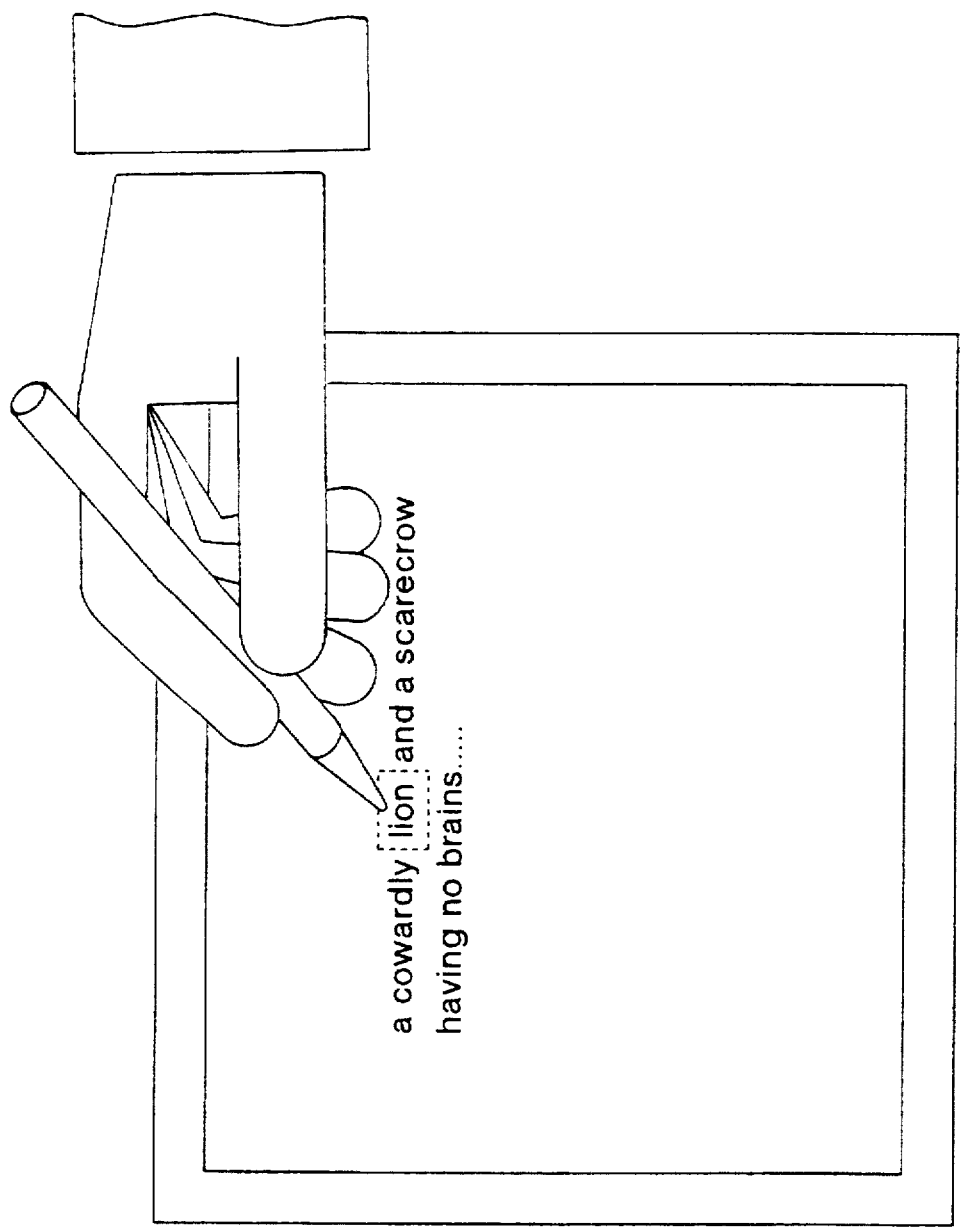
FIG. 8 is a diagram showing the designating operation for reproducing the two-dimensional bar code shown in FIG. 7.

The reproducing representation methods for various data are prepared and combined for utilization. It is assumed that the identification code is "MULTI□□□". In this case, character information, sound information and image information are related to one another and outputted, whose sheet is shown in FIG. 8.

Figure 7:
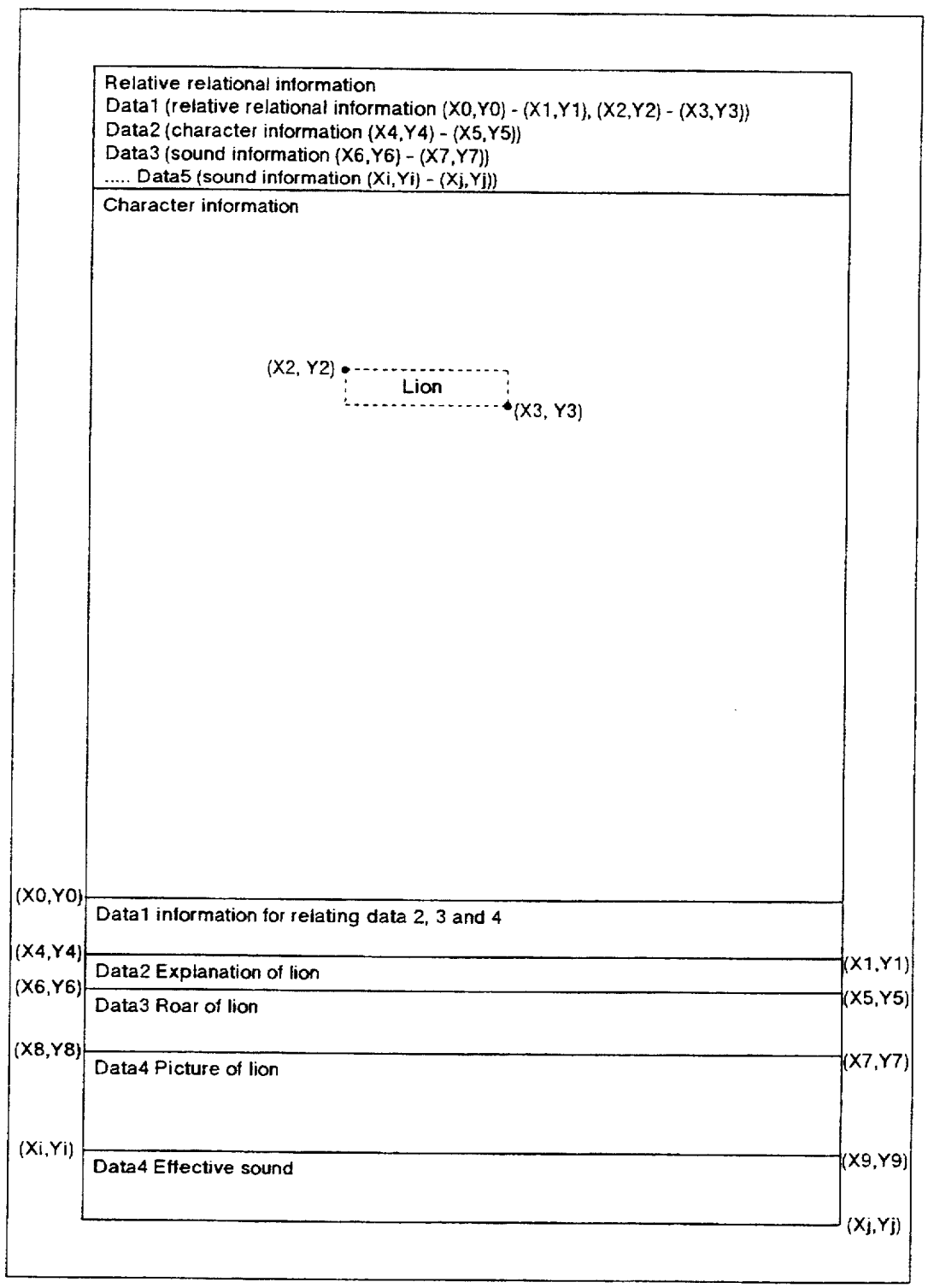
FIG. 7 is a diagram showing a print sheet (2) to which two-dimensional bar code is applied according to the present invention.

FIG. 7 is a diagram showing a print sheet (2) to which two-dimensional bar code is applied according to the present invention. FIG. 8 is a diagram showing the designating operation for reproducing the two-dimensional bar code shown in FIG. 7, in which the sheet image on the print sheet is read by the sheet reader 7 and specific character information is designated so that the information expressed in two-dimensional bar code which is related to the specific character information is called and reproduced.

Figure 9:
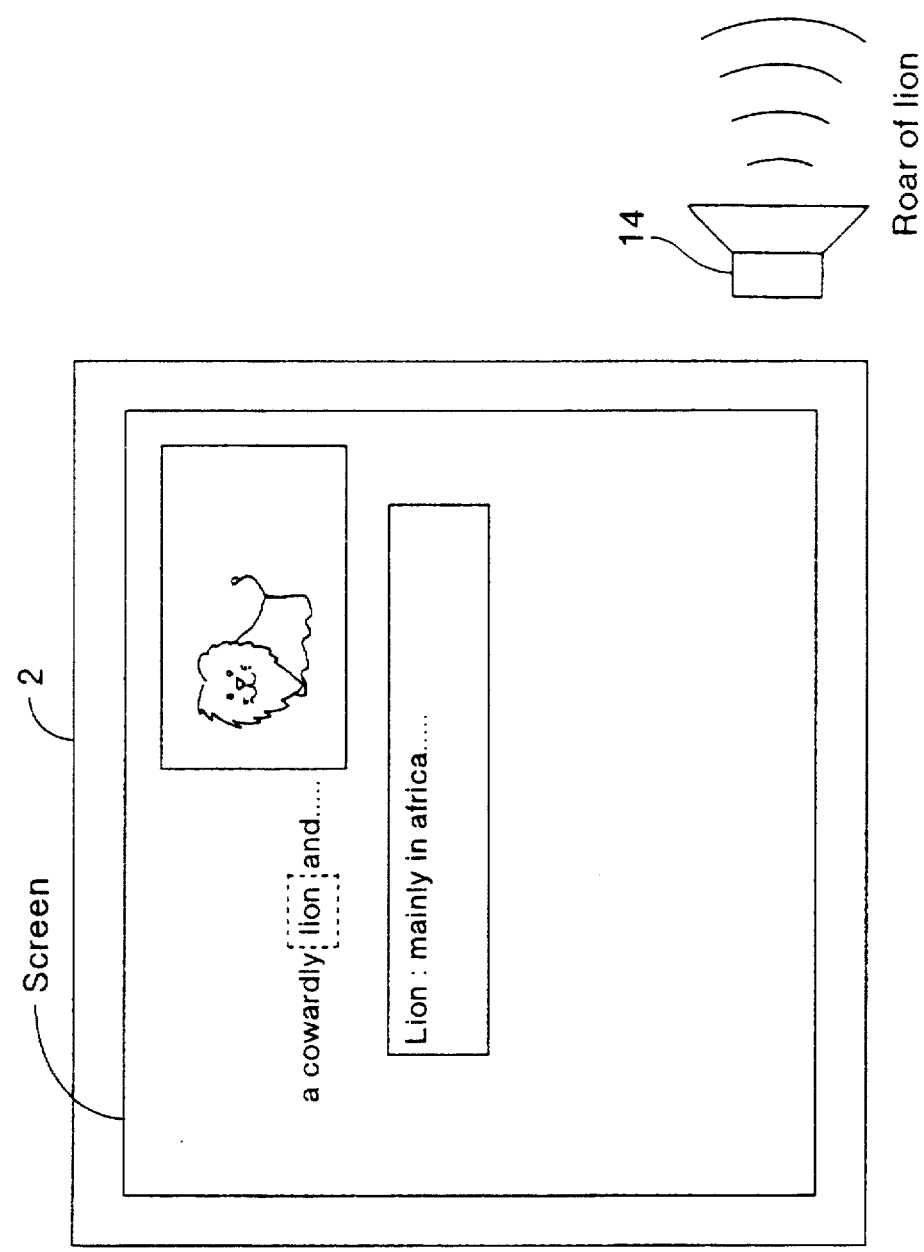
FIG. 9 is a diagram showing the reproduction and output processing of the two-dimensional bar code shown in FIG. 7.

FIG. 9 is a diagram showing the processing for reproducing and outputting the two-dimensional bar code shown in FIG. 7.

In FIG. 7, the multi-data processing function (identification code: "MULTI□□□") is set in such a manner that the picture of a lion, the text for explanation and the roar of the lion are reproduced. If the character of "Lion" in the displayed sheet images is designated (see FIG. 8), the picture (or photograph) of the lion is displayed as image information and the text of explanation "Lion: a big carnivorous mammal which lives in Africa, belongs to the feline family and is characterized by the mane of an adult male" is displayed as character information. In addition, the roar of the lion is reproduced as a voice through the speaker 14. FIG. 9 shows the state in which these data are reproduced.

According to Embodiment 3 shown in FIG. 5, not only the sound information but also the character information and the image information can be related and outputted.

If the character data and the image data other than a voice can be related to the image on the print sheet and the like, and reproduced, visual effects (the display of an annotation, the related chart and the like) can be obtained.

EMBODIMENT 4

Figure 10:
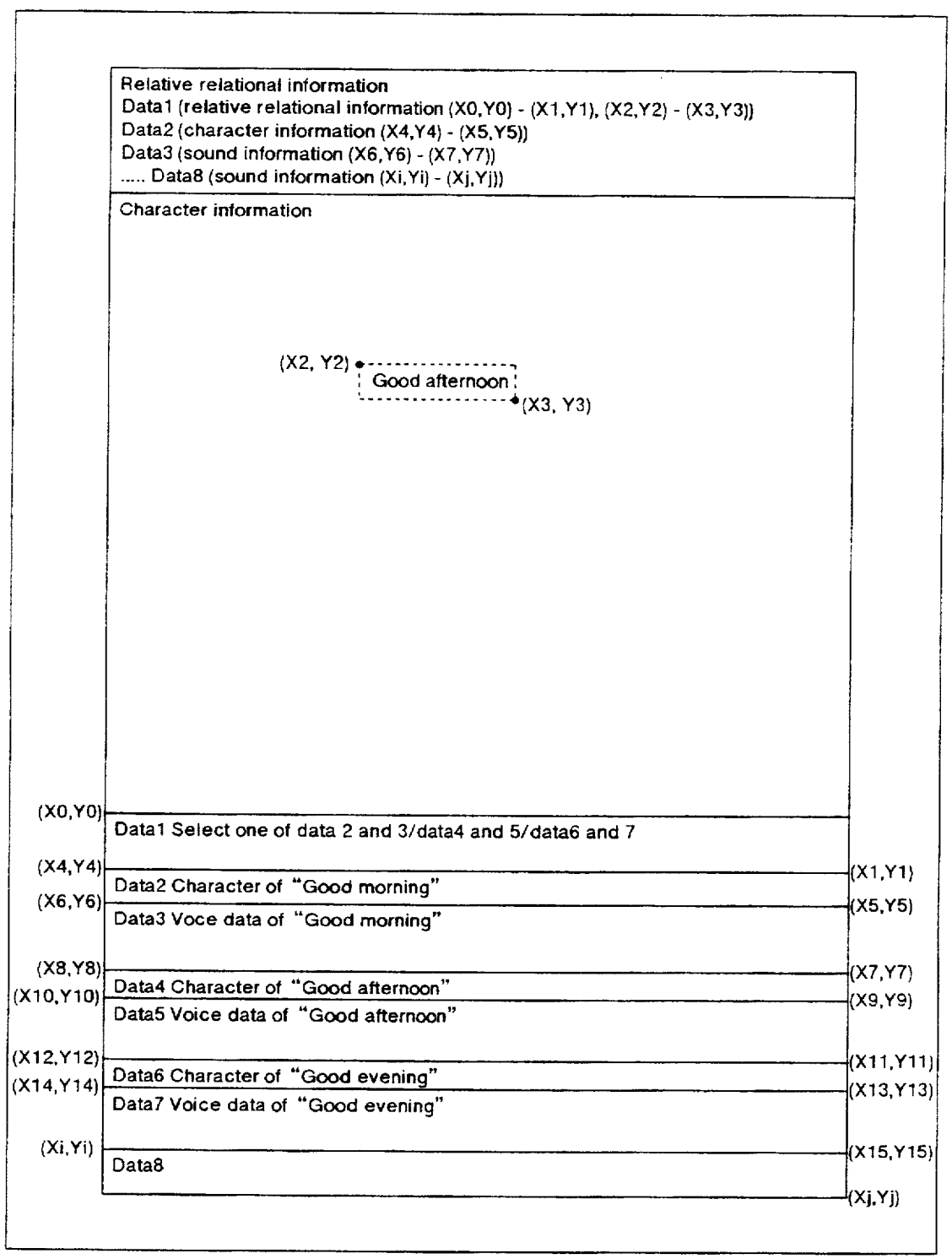
FIG. 10 is a diagram showing a print sheet (3) to which two-dimensional bar code is applied according to the present invention.

FIG. 10 is a diagram showing a print sheet (3) to which two-dimensional bar code is applied according to the present invention. In FIG. 10, a word of "greeting" is displayed in the text. In this portion, the selection of voice data ("greeting") of two-dimensional bar code information to be reproduced depending on a time is related to the mutual relational information. If "Good afternoon" is designated, the current time is checked. When the time is about noon, "Good afternoon" is reproduced.

Figure 11:
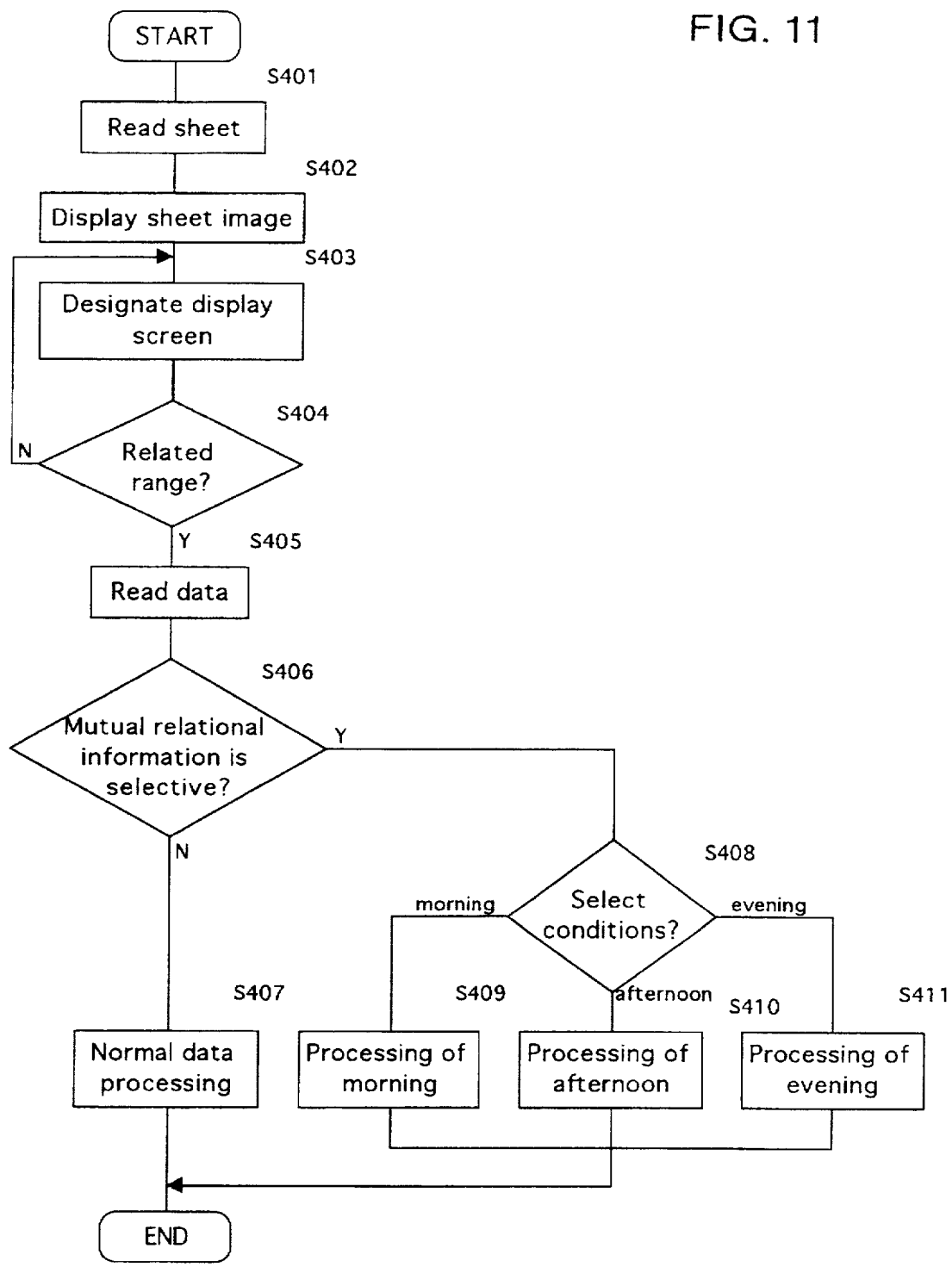
FIG. 11 is a flowchart showing the processing operation according to Embodiment 4 of the present invention.

FIG. 11 is a flowchart showing the processing operation according to Embodiment 4 of the present invention. With reference to FIG. 11, the flow of the processing operation will be described below by using the print sheet (3) shown in FIG. 10.

A sheet is read (Step S401), and the read sheet image is outputted to the display device and displayed thereon (Step S402). A screen is designated by the pointing device (Step S403). The relative relational information is retrieved, and the presence of the two-dimensional bar code information related to the range of the relative relational information is retrieved (Step S404). If present, the two-dimensional bar code information is read (Step S405). It is decided whether the attribute of the two-dimensional bar code is the selective mutual relational information or not (Step S406). If the attribute of the two-dimensional bar code is not the selective mutual relational information, the processing for data reproduction according to Embodiment 3 is executed (Step S407).

If the attribute of the two-dimensional bar code is the selective mutual relational information, the conditions for selection are checked (Step S408). The data to be reproduced is selected from plural two-dimensional bar code depending on the conditions, and processed (Steps S409 to S410).

FIGS. 12A, 12B and 12C are flowcharts showing the subroutine for each processing shown in FIG. 11. FIG. 12A shows the subroutine of Step S409 shown in FIG. 11 (the processing of morning greetings). FIG. 12B shows the subroutine of Step S410 shown in FIG. 11 (the processing of afternoon greetings). FIG. 12C shows the subroutine of Step S411 shown in FIG. 11 (the processing of evening greetings).

According to an example shown in FIG. 11, the time is the selecting condition. If it is morning, the character information on the document of the print sheet is changed to "Good morning" and the voice data which is related and reproduced is changed to "Good morning". If it is about noon, "Good morning" is changed to "Good afternoon". If it is after-evening, "Good morning" is changed to "Good evening".

According to Embodiment 4 shown in FIG. 11, the reproduction conditions are added to the mutual relational information on which the mutual relation of the two-dimensional bar code information is described. The two-dimensional bar code information can arbitrarily be selected from plural two-dimensional bar code information on the reproduction conditions, and can be reproduced.

Different data can be related to each other and reproduced on the reproduction conditions so that a plurality of documents can be created.

EMBODIMENT 5

FIG. 13 is a diagram showing an example of the display of a list which manages two-dimensional bar code information. In the case where only the data number, the data attribute and the size are managed, two-dimensional bar code information is unknown before reproduction as shown in FIG. 13. Consequently, a comment on the contents of the two-dimensional bar code information is incorporated into the relative relational information, the mutual relational information or data itself, and is added to items to be displayed at the time of listing.

Moreover, a sheet image that is within the range to which the two-dimensional bar code information is related is displayed as required so that the two-dimensional bar code information can be verified. When creating the relative relational information, extra blank space (such as right, left and bottom margin portions which are set when printing) is set in advance around a portion on which the two-dimensional bar code information is printed.

It is determined that at least one related range should be set to each two-dimensional bar code information, and that the designation of the pointing device to the sheet image is ignored with respect to the already related range.

If it is determined that the above range can be recognized as the related range only when listing, a comment can be referred to when adding some memorandum about the two-dimensional bar code information.

An example of the mutual relational information data to which the comment is added will be shown below. It is determined that the size of the comment is always arranged next to a header and that the comment corresponding to the size follows.

[4D 55 53 49 43 20 20 20]:
Header: "MUSIC□□□"
[11 00 00 00]:
Comment size: A comment is 17 bytes.
[43 6F 6E 67 72 61 74 75 72 61 74 69 6F 6E 73 21 21]:
Comment: "CONGRATULATIONS!!"
(The above contents are displayed when listing the two-dimensional bar code.)
[10 00 00 00]
Data size: Data is 16 bytes. Data [01 00 00 00 00 00 00 00 ... ] follows.

Figure 14:
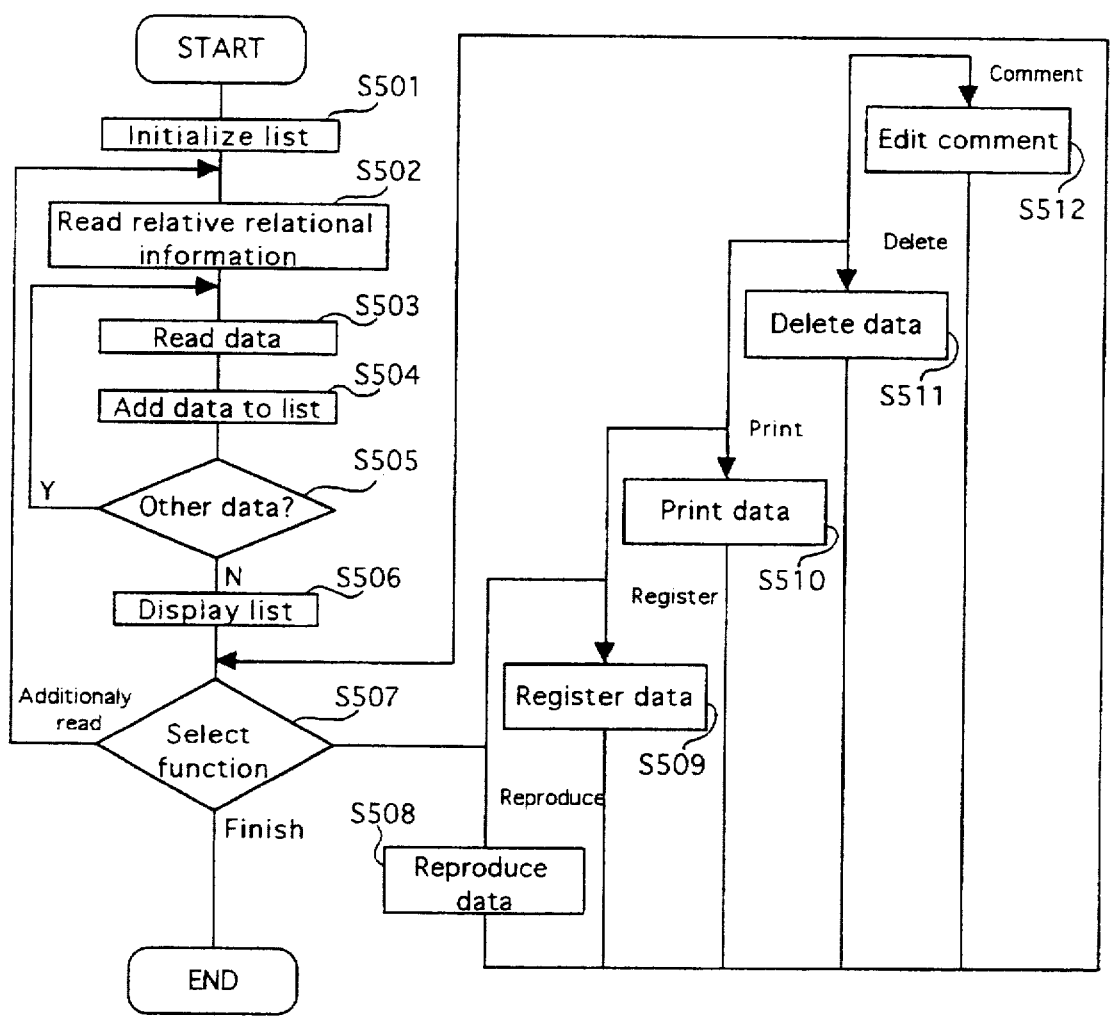
FIG. 14 is a flowchart showing the processing operation according to Embodiment 5 of the present invention.

A sheet image on a print sheet on which the two-dimensional bar code information is printed is read, and the two-dimensional bar code information is listed. According to Embodiment 5, the added comment and the sheet image which is within the related range are displayed in addition to the information set to the two-dimensional bar code (serial numbers, data attribute, data print range and data size) (see FIG. 13), operation according to Embodiment 5 of the present invention. In FIG. 14, an area for managing list information is reserved and initialized (Step S501). The reading of the print sheet is started. First of all, the relative relational information is read and the position information of the two-dimensional bar code information on the print sheet or the like is obtained (Step S502). The two-dimensional bar code information is read based on the relative relational information (Step S503) and added to a list (Step S504). This work is repeated as long as the two-dimensional bar code information is present (Step S505). The list is displayed (Step S506) and a processing branch is executed according to user's operation (Step S507). By cursor operation or the like, the field of the two-dimensional bar code in the list is inverted to indicate that it is selected. When a "reproduce" button is pressed, the data is reproduced in the form corresponding to data attribute (Step S508).

When a "register" button is pressed, the two-dimensional bar code data is stored in an external storage device (Step S509). When a "print" button is pressed, the selected two-dimensional bar code is printed (Step S510). When a "delete" button is pressed, the selected two-dimensional bar code is deleted from the list (Step S511). When characters are inputted or changed in the comment field of each two-dimensional bar code, the comment is added to data or the contents of change are reflected (Step S512). When the additional reading function is designated, the routine returns to the processing for reading a new sheet (Step S502). If "finish" is selected, the processing is ended.

More specifically, it is almost impossible for a user to distinguish data by two-dimensional bar code. Therefore, the data which is listed is unknown before reproduction. Even if the data are collected so as to be utilized later on, the memory for the data is lost after a while. After all, it is necessary to recognize the data again. A user who creates data or utilizes the data again can add a comment to the data and can readily verify the added contents, so that a data user can grasp the data easily.

For example, assume that 5 kinds of two-dimensional bar code are printed on a sheet. When reading and listing the two-dimensional bar code, it is impossible to decide whether the data is object data or not if an annotation is not displayed but the attribute and data size are displayed. When sequentially reproducing and verifying the listed data, useless work should be executed four times if fifth data is the object data. Such useless work can be avoided.

According to Embodiment 5 shown in FIG. 14, the contents necessary for the management of the two-dimensional bar code information are listed and displayed. Consequently, the management contents of the two-dimensional bar code information can be distinguished easily.

EMBODIMENT 6

The identification code indicative of data which is automatically executed based on the attribute of two-dimensional bar code information (for example, "FIRSTEXE") is set. When first reading a sheet, the two-dimensional bar code information having this identification code is retrieved as automatic execution two-dimensional bar code (automatic execution data). A layout is changed or document images are modified according to the contents of the two-dimensional bar code information.

Figure 15:
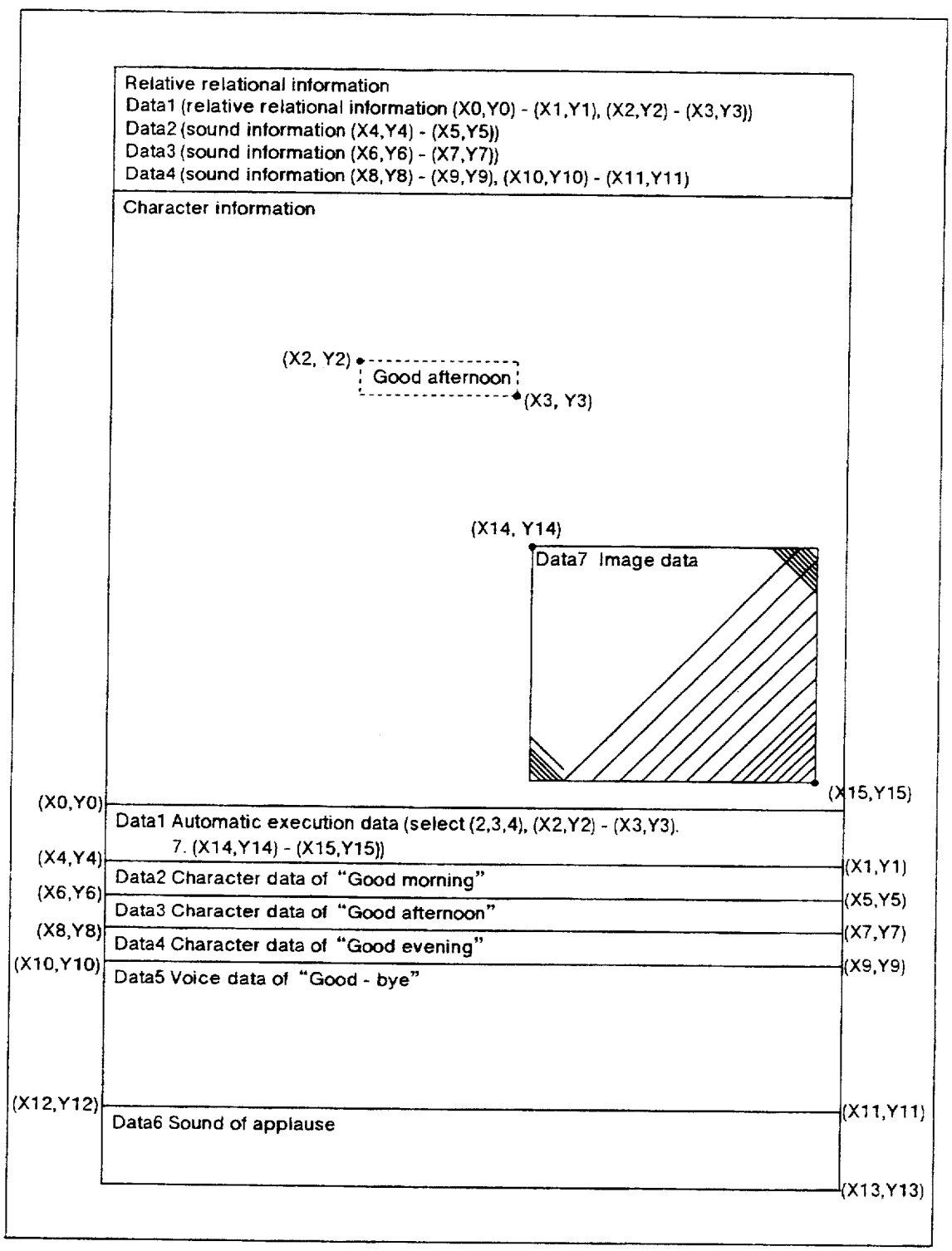
FIG. 15 is a diagram showing a print sheet (4) to which two-dimensional bar code is applied according to the present invention.
Figure 16:
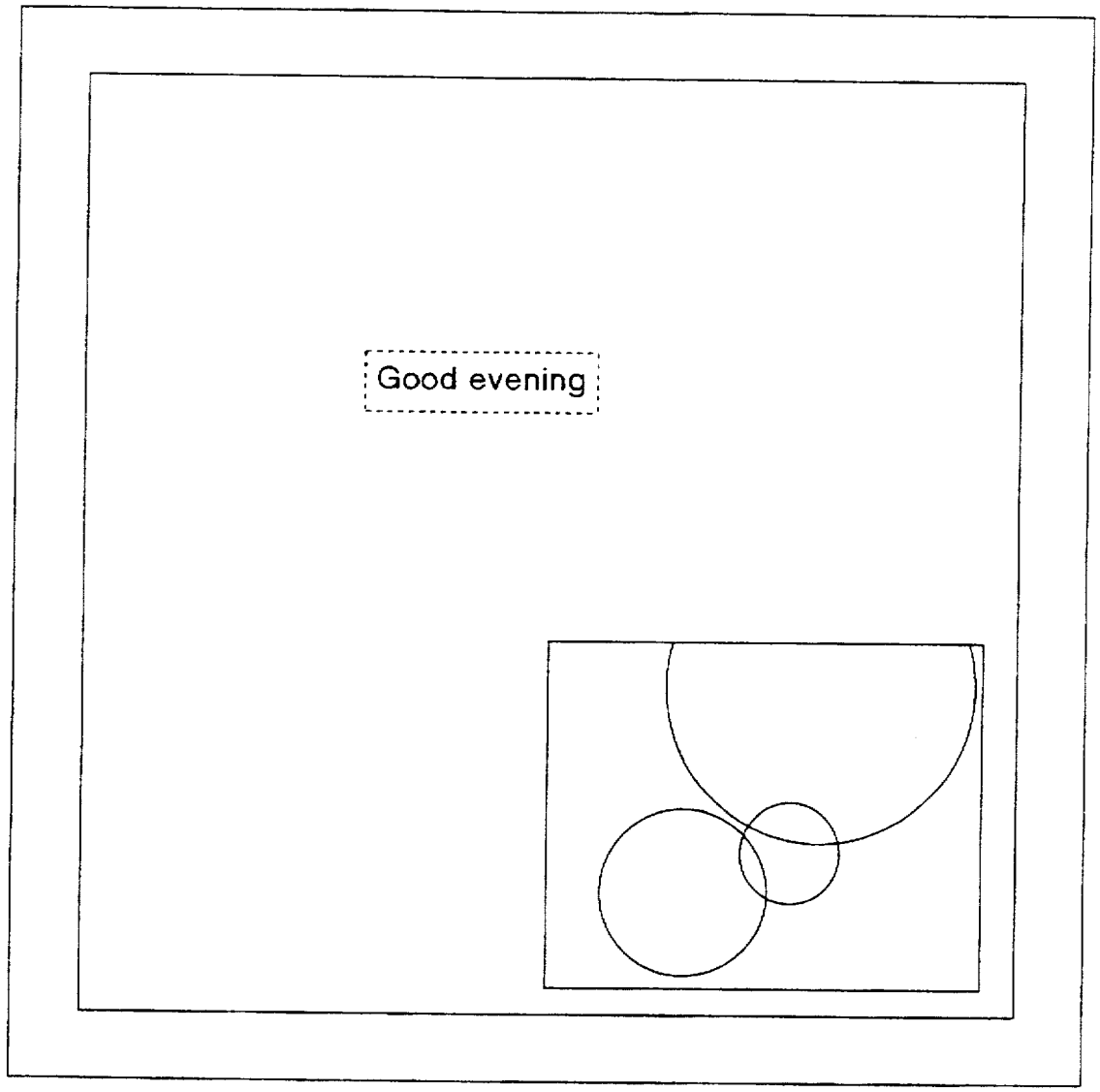
FIG. 16 is a diagram showing an example of the display of image information which is modified.

FIG. 15 is a diagram showing a print sheet (4) to which two-dimensional bar code is applied according to the present invention. More specifically, FIG. 15 shows an image on the print sheet having the modifying function which includes automatic execution data (modifying information). FIG. 16 is a diagram showing an example of the display of image information which is modified. More specifically, FIG. 16 shows an example of the display of image information which is modified based on the automatic execution data while the print sheet is read and displayed.

Figure 17:
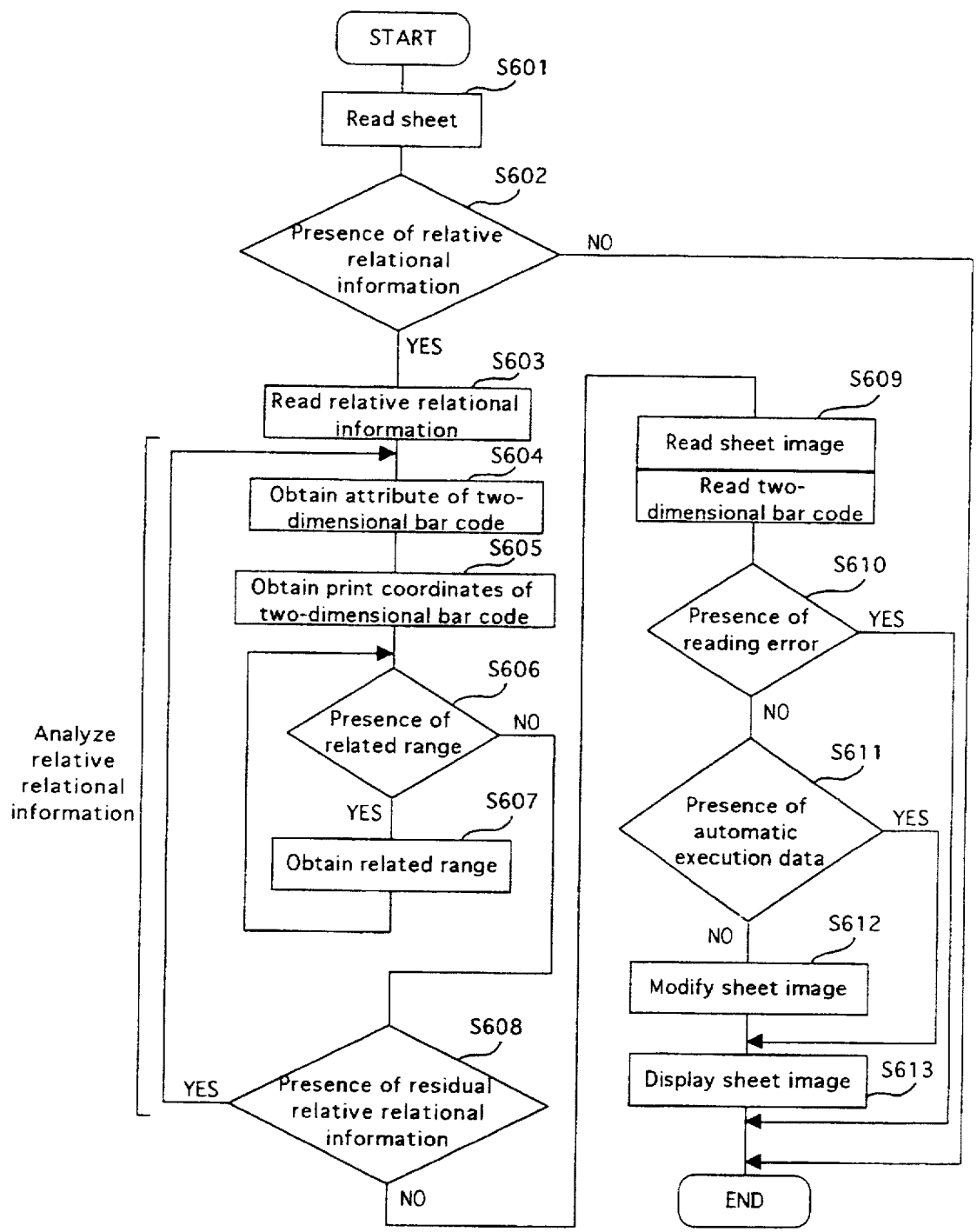
FIG. 17 is a flowchart showing the processing operation according to Embodiment 6 of the present invention.

FIG. 17 is a flowchart showing the processing operation according to Embodiment 6 of the present invention. More specifically, FIG. 17 shows, in detail, the processing to be executed after the sheet is read and before the sheet image is displayed.

Sheet reading is started (Step S601). While reading the sheet image, it is decided whether the relative relational information is printed or not (Step S602). If the relative relational information is not printed, the processing is not required particularly and is ended.

If the relative relational information is printed, two-dimensional bar code is extracted from an image for the relative relational information and converted into digital data (Step S603). The relative relational information thus obtained is analyzed (Steps S604 to S608). Since plural two-dimensional bar code information are included, the attribute, the printed coordinates, the related range and the like are sequentially checked (Steps S604 and S605), and the coordinates and range are stored in the memory 5 (Steps S606 and S607). This processing is repeated until all the relative relational information expressed in two-dimensional bar code are completely processed (Step S608).

The sheet image reading is continued. The two-dimensional bar code information is properly read from the sheet image according to the data of relative relational information groups which have already been obtained, and stored in the memory 5 (Step S609).

When the reading is finished, the contents of each two-dimensional bar code information are checked. If there is an error, processing is executed (Step S610). Each two-dimensional bar code information is checked so that it is decided whether the automatic execution data is present or not (Step S611). If the automatic execution data is present, the sheet image is changed and modified according to the automatic execution data (Step S612). The sheet image is outputted to the display device 2 and displayed thereon (Step S613).

While plural two-dimensional bar code information are selected and reproduced in Embodiment 4 shown in FIG. 11, the selected contents are not reflected until a user performs operation. If modification can be executed before the sheet image obtained by reading the print sheet is displayed, it is possible to eliminate a problem that the display does not conform to the reproduced contents during operation.

In order to keep the precision of character information and image information by changing the layout of the print sheet and reading the print sheet, the character information and the image information can be recorded as two-dimensional bar code information in advance and sheet images can be spread on the print sheet before display.

If a blank for a memorandum for two-dimensional bar code is painted out in white, the information images which are not necessary for writing to the print sheet are not displayed by the display device.

According to Embodiment 6 shown in FIG. 17, the information on the print sheet which has been read is automatically modified before output, so that the information within the range to which the two-dimensional bar code is related can match the information which is related and reproduced.

EMBODIMENT 7

Figure 18:
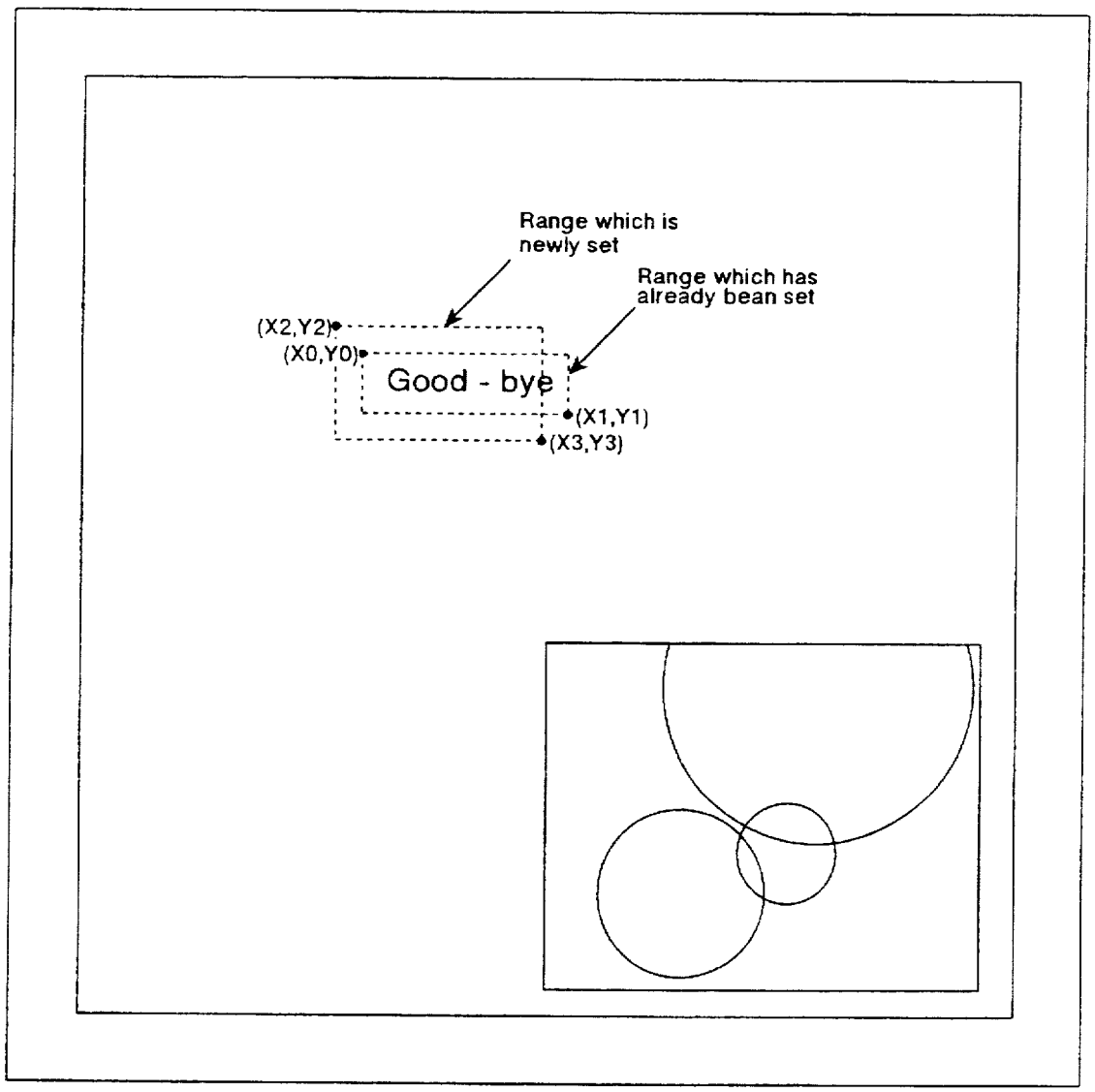
FIG. 18 is a diagram showing a screen image obtained during the work for relating two-dimensional bar code to the arbitrary range of a document.

FIG. 18 is a diagram showing a screen image obtained during the work for relating two-dimensional bar code to the arbitrary range of a document.

Figure 19:
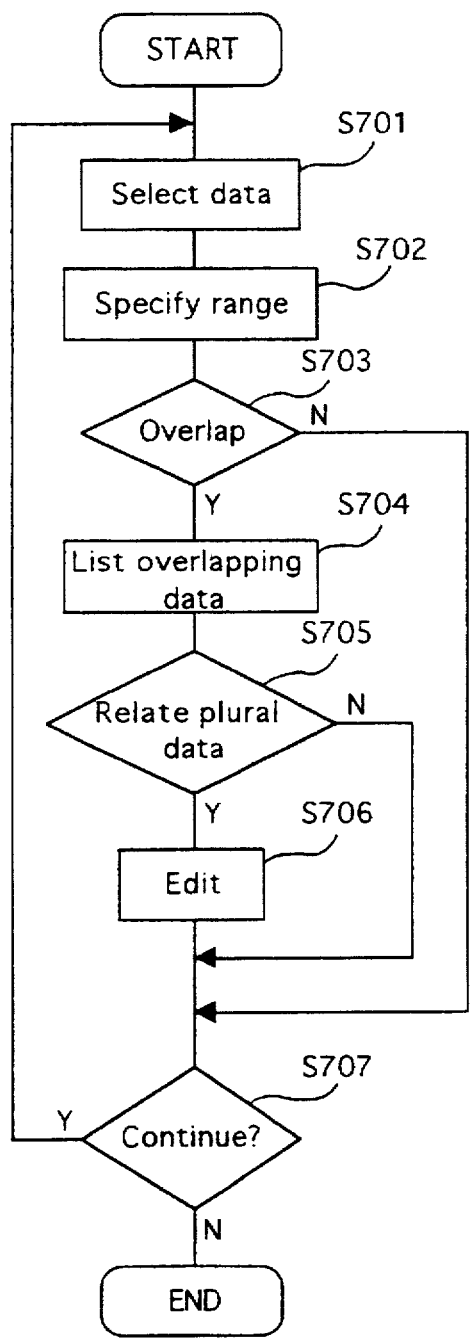
FIG. 19 is a flowchart showing the processing operation according to Embodiment 7 of the present invention.

FIG. 19 is a flowchart showing the processing operation according to Embodiment 7 of the present invention. More specifically, FIG. 19 shows the flow of the work for relating the two-dimensional bar code to the arbitrary range of the document.

The data which should be arranged on the sheet is selected from a list (Step S701), and the related range is verified and set on the screen (Step S702). The information processor 15 decides whether the set range and the range which has already been arranged overlap each other or not (Step S703). If they do not overlap each other, the routine proceeds to the processing for deciding whether the next edit should be executed or not (Step S707). If they overlap each other (see FIG. 18), the two-dimensional bar code data which overlap are listed (Step S704). It is decided whether the mutual relational information which relates plural two-dimensional bar code information should be created or not (Step S705).

If the mutual relational information should be created, the information processor 15 prepares the information for relation such as the selection of the data reproducing method which is determined by arrangement positions and the attribute of each data, and a user designates a parameter which has not been set yet (Step S706). When the arrangement of two-dimensional bar code is finished, it is decided whether the next two-dimensional bar code is arranged and edited or not (Step S707). If it is to be continued, the routine returns to the processing for selecting two-dimensional bar code data (Step S701). If it is to be ended, the processing for arrangement and edit is finished.

More specifically, it is verified whether the ranges to which plural two-dimensional bar code are related overlap or not, and the routine can proceed to a mode for automatically editing the mutual relational information. Consequently, a sheet creator does not need to create the mutual relational information in advance if plural two-dimensional bar code should be related to the same portion.

It is very hard to create the mutual relational information in consideration of the range where the two-dimensional bar code is related and arranged. Accordingly, data is actually arranged during the edit work for relating the two-dimensional bar code to the sheet. In the stage where various mutual relations are fixed, the mutual relational information is created as required. Consequently, the work can be performed easily. In addition, the arrangement position and kind of the data are fixed so that the information processor can create most of information automatically. Thus, the work can be performed more easily.

According to Embodiment 7 shown in FIG. 19, the mutual relational information need not be created in advance before the print sheet is edited if plural two-dimensional bar code should be related to the information within the arbitrary range of the print sheet and reproduced. During the edit work for arranging the two-dimensional bar code information on the print sheet, the mutual relational information can be created and edited as required.

According to the present invention, the following effects can be obtained.

The visual information which is within the predetermined range on the print sheet and two or more sound information which are converted into two-dimensional bar code information are set so as to be related to each other and reproduced. For example, the standard sound information and the incidental sound information can automatically be reproduced in pairs.

Plural sound information expressed in two-dimensional bar code which are related to the visual information within the predetermined range on the print sheet can be reproduced at an arbitrary timing. Consequently, the plural sound information can be overlapped and reproduced. Furthermore, if sound information is overlapped and repeated plural times at an arbitrary timing, the sound information can be reproduced for a longer time as compared with the information volume described on the print sheet. In addition, the music can be played depending on the processing and reproducing timing of the sound information.

An information source which is related to the predetermined range on the print sheet includes the visual information such as character information, image information and the like as well as the sound information. Consequently, the representation form of a document is expanded so that more various two-dimensional bar code using methods can be enhanced. If the character information and the image information can be displayed on the screen, visual effects can be obtained.

Reproduction conditions are added to the mutual relational information which indicates the mutual relation between the two-dimensional bar code information, so that the two-dimensional bar code information can be selected arbitrarily from plural two-dimensional bar code information and reproduced.

Since the contents necessary for the management of the two-dimensional bar code information are listed and displayed, the management contents of the two-dimensional bar code can be distinguished easily.

When outputting, to the screen, the information within the range to which the two-dimensional bar code information is related, the same information can be modified automatically so as to match the information which should be reproduced.

In the case where plural two-dimensional bar code information should be related to the information within the arbitrary range of the print sheet and reproduced, the mutual relational information can be created and edited as required during the work for arranging the two-dimensional bar code information on the print sheet and editing the same.

Although the present invention has fully been described by way of example with reference to the accompanying drawings, it is to be understood that various changes and modifications will be apparent to those skilled in the art. Therefore, unless such changes and modifications depart from the scope of the invention, they should be construed as being included therein.

What is claimed is:

1. An information processor having two-dimensional bar code processing function, comprising:

a visual information input portion inputting a visual information including document information, image information and graphic information;

a display portion displaying on a screen the visual information input by the visual information input portion;

a sound information input portion inputting sound information related to the visual information displayed on the screen;

a relative relational information input portion inputting relative relational information indicating that, the sound information input by the sound information input portion is the sound information related to the visual information displayed in a predetermined range of the screen;

a converting portion converting the sound information and the relative relational information into two-dimensional bar code information according to a predetermined procedure conversion;

a printing portion printing on a print sheet the visual information input by the visual information input portion and the two-dimensional bar code information converted by the converting portion;

a reading portion reading the visual information and the two-dimensional bar code information which are printed on the print sheet, and selectively displaying the visual information on a screen of the display portion;

a pointing device designating the predetermined range of the visual information displayed on the screen;

a restoring portion restoring the two-dimensional bar code information related to the visual information in the predetermined range designated by the pointing device into the sound information and the relative relational information; and a reproducing portion identifying the sound information on the basis of the relative relational information, and reproducing the sound information according to a predetermined procedure reproduction.

2. The information processor having two-dimensional bar code processing function according to claim 1, further comprising a sound information synthesizing portion for synthesizing plural sound information based on said relative relational information.

3. The information processor having two-dimensional bar code processing function according to claim 2, wherein said relative relational information includes timing information for causing said sound information synthesizing portion to synthesize plural sound information.

4. The information processor having two-dimensional bar code processing function according to claim 1, wherein said converting portion has a function of converting visual information to two-dimensional bar code information according to the predetermined procedure for conversion, and said restoring portion has the function of restoring the two-dimensional bar code information to the visual information.

5. The information processor having two-dimensional bar code processing function according to claim 1, wherein said relative relational information includes reproduction condition information indicative of conditions on which said reproducing portion reproduces plural sound information.

6. The information processor having two-dimensional bar code processing function according to claim 1, further comprising a list information setting portion for setting list information indicative of the attribute, coordinates/size and comment of plural two-dimensional bar code information which are related to said visual information, a list information storage portion for storing the set list information, and a display control portion for displaying said list information on said display portion in a multi-window.

7. The information processor having two-dimensional bar code processing function according to claim 1, wherein said relative relational information includes modifying information for directing that the contents of the display of the visual information which is within the range related to the two-dimensional bar code information should be modified.

8. The information processor having two-dimensional bar code processing function according to claim 7, further comprising a modifying portion for modifying the contents of the visual information which is within the range related to the two-dimensional bar code information to those of the two-dimensional bar code information which is prepared in advance by the modifying directions of said relative relational information.

9. The information processor having two-dimensional bar code processing function according to claim 1, further comprising a range setting portion for setting the range of visual information related to two-dimensional bar code information, and a relative relational information creating portion for deciding whether the set ranges overlap each other or not, and additionally creating the identification code of the relational information which is within the overlapped range.

10. The information processor having two-dimensional bar code processing function according to claim 1, wherein said relative relational information includes position information indicative of the predetermined range of visual information and the range of two-dimensional bar code information related to said predetermined range.

* * * * *